US010086516B2

(12) United States Patent
Dubrovsky et al.

(10) Patent No.: US 10,086,516 B2
(45) Date of Patent: Oct. 2, 2018

(54) COLOR- OR GRAYSCALE-SENSING, MAGNETIC, MOBILE, MARKING ROBOT

(71) Applicant: President and Fellows of Harvard College, Cambridge, MA (US)

(72) Inventors: Zivthan A. Dubrovsky, Lexington, MA (US); Raphael G. Cherney, Cambridge, MA (US); Michael Mogenson, Cambridge, MA (US); Justin Werfel, Somerville, MA (US); Kathleen O'Donnell, Cambridge, MA (US); Radhika Nagpal, Cambridge, MA (US); Nils Napp, Cambridge, MA (US); Hani M. Sallum, Somerville, MA (US); Julian U. da Silva Gillig, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 152 days.

(21) Appl. No.: 15/281,382

(22) Filed: Sep. 30, 2016

(65) Prior Publication Data
US 2017/0036349 A1 Feb. 9, 2017

Related U.S. Application Data

(63) Continuation-in-part of application No. PCT/US2015/023952, filed on Apr. 1, 2015.

(60) Provisional application No. 62/323,770, filed on Apr. 17, 2016, provisional application No. 61/973,936, filed on Apr. 2, 2014.

(51) Int. Cl.
*G05B 15/00* (2006.01)
*B25J 9/16* (2006.01)
*B43L 13/02* (2006.01)

(52) U.S. Cl.
CPC .............. *B25J 9/1697* (2013.01); *B25J 9/162* (2013.01); *B43L 13/022* (2013.01); *Y10S 901/01* (2013.01)

(58) Field of Classification Search
CPC .................................. F02C 7/277; F02C 3/04
See application file for complete search history.

(56) References Cited

U.S. PATENT DOCUMENTS

| 4,541,771 A | 9/1985 | Beni et al. |
| 4,990,841 A | 2/1991 | Elder |
| 5,204,814 A | 4/1993 | Noonan et al. |
| 6,367,902 B1 | 4/2002 | Saund et al. |

(Continued)

FOREIGN PATENT DOCUMENTS

WO    2012/150846 A2    11/2012

OTHER PUBLICATIONS

USPTO, International Search Report and Written Opinion for PCT/US2017/027856 (Jun. 26, 2017) (a related PCT application).

(Continued)

*Primary Examiner* — Ian Jen
(74) *Attorney, Agent, or Firm* — Modern Times Legal; Robert J. Sayre

(57) ABSTRACT

In a method for interactive marking by a mobile robot on a vertical surface, a mobile robot that includes a sensor and an actuated marker is displaced across a vertical surface. Features on, in or behind the vertical surface are detected with the sensor. Displacement of the mobile robot and actuation of the actuated marker is controlled in response to the detection of these features.

32 Claims, 13 Drawing Sheets

(56) References Cited

U.S. PATENT DOCUMENTS

| | | | |
|---|---|---|---|
| 8,522,905 B2 | 9/2013 | Lama | |
| 8,847,590 B2 | 9/2014 | Flock et al. | |
| 9,193,066 B2* | 11/2015 | Ohm | B25J 5/005 |
| 9,220,567 B2 | 12/2015 | Sutherland et al. | |
| 2006/0028751 A1* | 2/2006 | Takeuchi | G02B 7/1821 |
| 2006/0238156 A1 | 10/2006 | Kim | |
| 2013/0084775 A1* | 4/2013 | Mimlitch, III | A63H 29/22 |
| | | | 446/457 |
| 2013/0288560 A1 | 10/2013 | Abou-Hamda | |
| 2015/0287487 A1* | 10/2015 | Medoff | C10L 5/442 |
| | | | 250/492.1 |

OTHER PUBLICATIONS

European Patent Office, Extended European Search Report for European Application No. 15772257.0 (corresponding EP application) (Dec. 6, 2017).
Bruce Land, "Whiteboard eraser robot," Youtube <available at https://www.youtube.com/watch?v=DSR4BmmaPEk> (retrived by EPO on Nov. 27, 2017).
F. Mondada, et al., "The e-puck, a Robot Designed for Education in Engineering", Proceedings of the 9th Conference on Autonomous Robot Systems and Competition, Portugal, vol. 1, No. 1, 59-65 (2009).
Staceyk, "Wallbots: Autonomous Magnetic Robots that Traverse Vertical Surfaces", Instructables <https://www.instructables.com/id/Wallbots-Autonomous-Magnetic-Robots-that-Traverse/> (May 8, 2009).
USPTO, International Search Report and Written Opinion for PCT/US15/23952 (PCT application to which priority is claimed) (Jul. 10, 2015).

* cited by examiner

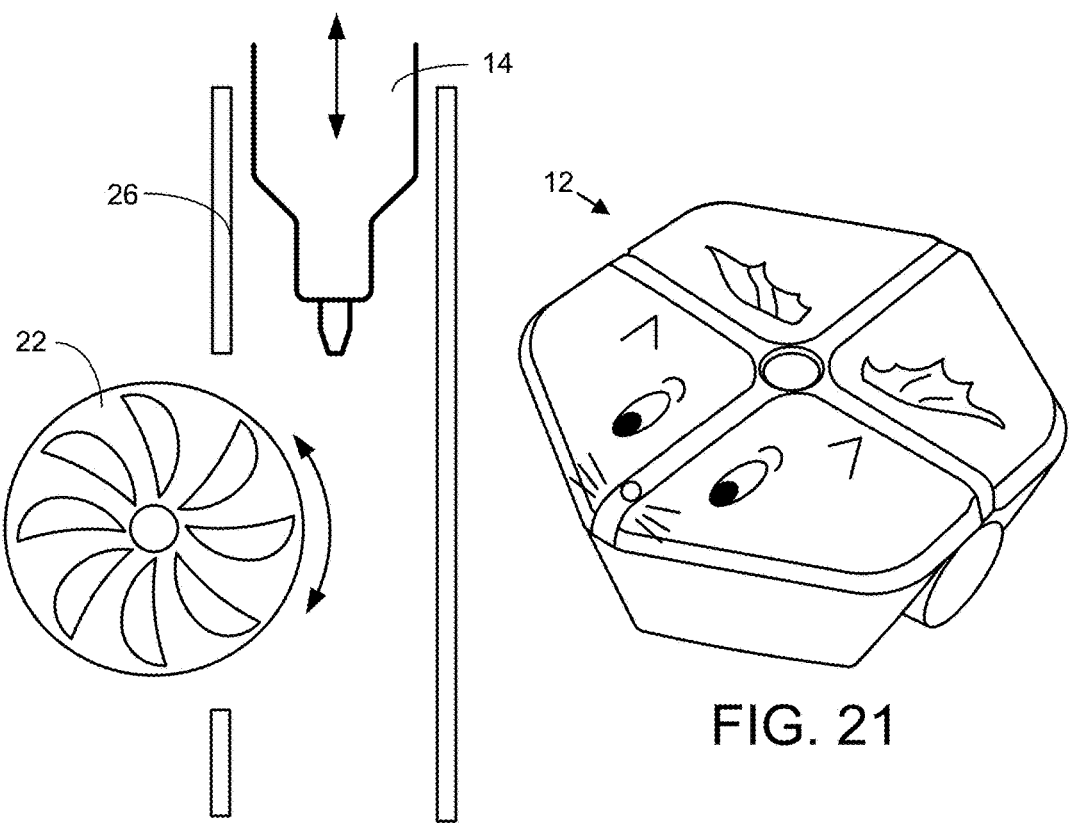
FIG. 19
FIG. 21
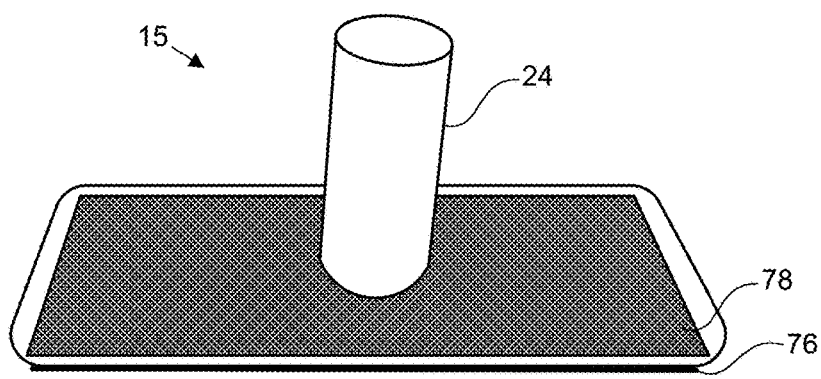
FIG. 20

COLOR- OR GRAYSCALE-SENSING, MAGNETIC, MOBILE, MARKING ROBOT

RELATED APPLICATIONS

This application is a continuation-in-part of PCT Application No. PCT/US2015/023952, filed on 1 Apr. 2015, the entire contents of which are incorporated herein by reference.

This application also claims the benefit of U.S. Provisional Application No. 61/973,936, filed on 2 Apr. 2014, and of U.S. Provisional Application No. 62/323,770, filed on 17 Apr. 2016, the entire content of both of which are incorporated herein by reference.

BACKGROUND

The United States has a problem with education in science, technology, engineering, and mathematics, commonly known as "STEM" fields. Jobs in these domains are a primary driver of the modern economy, and an increasing number of jobs in other fields require knowledge of STEM. However, many students are not successfully learning core concepts. According to recent reports:
- 75% of U.S. eighth graders are not proficient in mathematics when they complete eighth grade;
- 79% of twelfth graders do not perform at a proficient level in science; and
- 54% of high school graduates are not ready for college-level math.

Furthermore, there are not enough students studying STEM disciplines to meet the country's needs. Moreover, according to recent reports:
- 38% of students who start with a STEM major do not graduate with one.
- The U.S. may be short as many as 3 million high-skill workers by 2018.

In order to combat this trend and inspire more students to pursue STEM studies, the President's Council of Advisors on Science and Technology has recommended that we "create STEM-related experiences that excite and interest students of all backgrounds". We propose creating engaging learning experiences through the use of a specially designed robot. Robots have been found to be an exciting and motivating tool for students, as such we believe they can also be powerful educational tools. They can help teach problem solving, logic, programming, computational thinking, and much more. By lowering the hurdle of prerequisite technical knowledge, we believe that robots designed for the classroom can lead to unique and stimulating learning experiences for students of all ages.

SUMMARY

Magnetic, color or grayscale (e.g., more than two shades of darkness without relying on color per se) sensing, mobile, marking robots and methods for interactive marking by a mobile robot are described herein. Various embodiments of the apparatus and methods may include some or all of the elements, features and steps, described below.

Described herein is a robot that can navigate on vertically mounted whiteboards or on other ferromagnetic surfaces using at least two wheels and magnets in the wheels or elsewhere in or coupled with the robot body. The robot includes a robot body that includes a marker holder (e.g., an aperture defined in the robot body) and includes an actuator configured to reciprocally displace a shaft in the marker holder. The shaft can take the form of a marker (e.g., a dry erase marker) or a shaft that includes or is coupled with an eraser. The robot can also include an array of color or grayscale sensors on the top surface and/or bottom surface of the robot body, wherein the sensors are configured to detect color patterns or patterns with differing degrees of darkness as the robot is displaced across the vertically oriented surface. A computing device can be in communication with the sensors, the actuator, and the wheels, wherein the computing device includes a processor and computer-readable memory in communication with the processor. The computer-readable memory includes program code for at least one of the following actions: displacing the robot and actuating the actuator in response to and as a function of measurements from the sensors.

In a method for interactive marking by a mobile robot on a vertical surface, a mobile robot that includes a sensor and an actuated marker is displaced across a vertical surface. Features on, in or behind the vertical surface are detected with the sensor. Displacement of the mobile robot and actuation of the actuated marker is controlled in response to the detection of the features.

Users can interact with the robot by wirelessly controlling the device through a smartphone, tablet, or computer and by drawing directly on the whiteboard to change the robot's environment. Though the robot is, therefore, particularly well suited for classroom use, we believe the robot also has strong potential as an educational toy for the home. Parents who have computing devices in their homes and want to provide engaging and educational experiences for their children can purchase the robot for their kids to use at home, enabling children to have fun and learn at home, while the parents invest in a "toy" that will have a longer lifetime than most and provides tangible learning benefits. While the robot is primarily described as moving across a vertical surface (e.g., a vertically mounted whiteboard), the robot can alternatively be operated on a table, floor or other surface oriented horizontally or at other orientations.

BRIEF DESCRIPTION OF THE DRAWINGS

FIG. 19 shows an embodiment of the actuation mechanism that uses a compressive roller, wherein the compressible roller is used to apply pressure and to grip the marker to move it.

FIG. 20 is an image of an embodiment of the eraser accessory. The shaft on the eraser can be mounted the same way the marker is mounted, and the robot can actuate the eraser in the same way as it does the marker.

FIG. 21 is an image of a robot with a customizable case, wherein the top surface of the robot is a magnetic and/or dry erase whiteboard surface.

Figure 1:
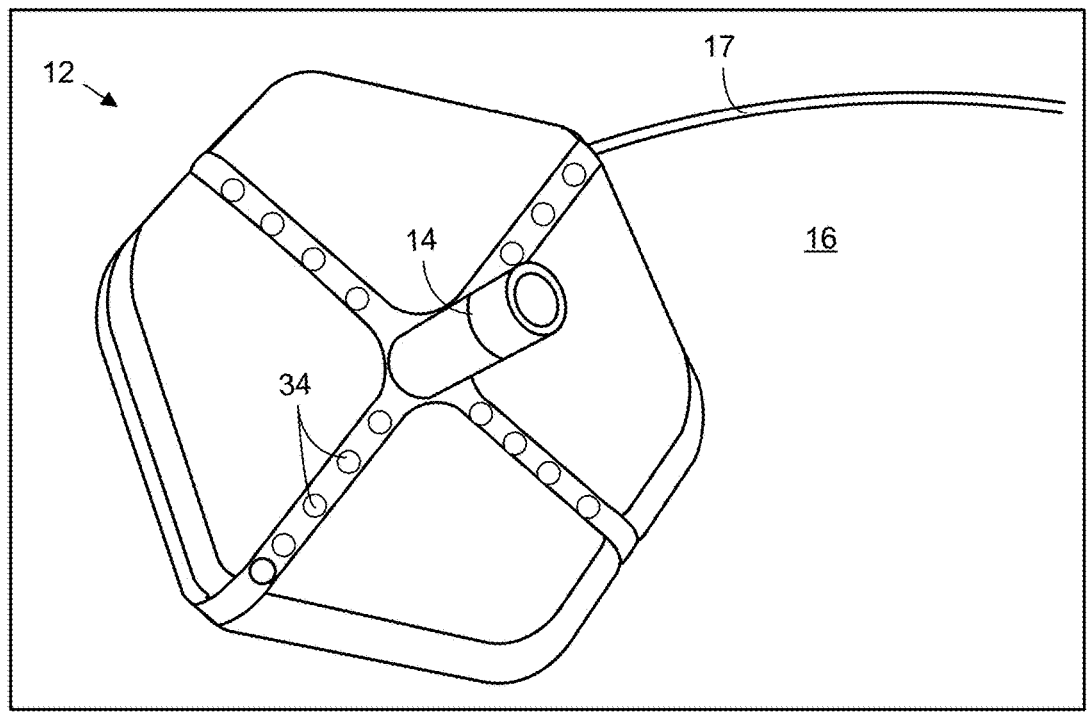
FIG. 1 is a photographic image of a robot prototype drawing on a whiteboard.

In the accompanying drawings, like reference characters refer to the same or similar parts throughout the different views; and apostrophes are used to differentiate multiple instances of the same or similar items sharing the same reference numeral. The drawings are not necessarily to scale, emphasis instead being placed upon illustrating particular principles, discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can represent either by weight or by volume. Processes, procedures and phenomena described below can occur at ambient pressure (e.g., about 50-120 kPa—for example, about 90-110 kPa) and temperature (e.g., −20 to 50° C.—for example, about 10-35° C.).

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

Figure 2:
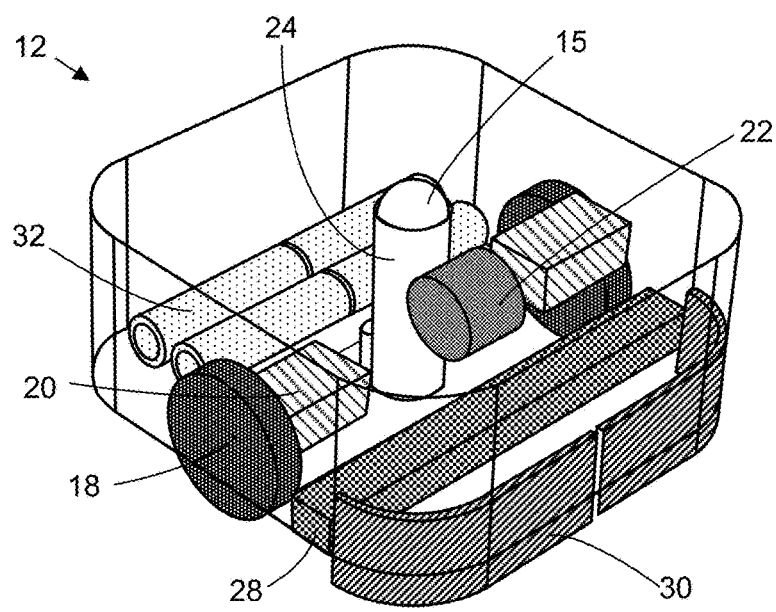
FIG. 2 shows a schematic layout of features in one embodiment of the robot.

Environment:

We have developed a mobile robot 12, as shown in FIGS. 1 and 2, for use in classrooms that is able to drive on and modify (through the use of an actuated marker 14 or eraser 15) magnetic whiteboards 16 (while the term, "whiteboard," is used herein, the surface color need not be strictly white, as long as it can be non-permanently be marked). Whiteboards 16 are uniquely well suited for miniature mobile robots for the following reasons:

users can easily change the environment by drawing or erasing on the surface of the whiteboard 16;

robots 12 can interact with the user and other robots 12 by changing the environment;

the whiteboard surface can be mounted vertically to take up minimal space;

a vertically mounted surface is easier to observe from different locations;

when mounted vertically, gravity can provide orientation information through a low-cost accelerometer;

whiteboards 16 are widely available for purchase in a variety of sizes; and whiteboards 16 are already installed in a variety of locations, including schools.

While whiteboards 16 provide a specialized and unique environment for the robot 12, the robot 12 can be designed to also work on horizontal, non-magnetic surfaces using the same wheels 18. This flexibility opens up additional environments and use cases for the robot 12. For example, the robot 12 can be used on tables or floors, allowing kids to touch and easily interact with the robot 12.

Figure 3:
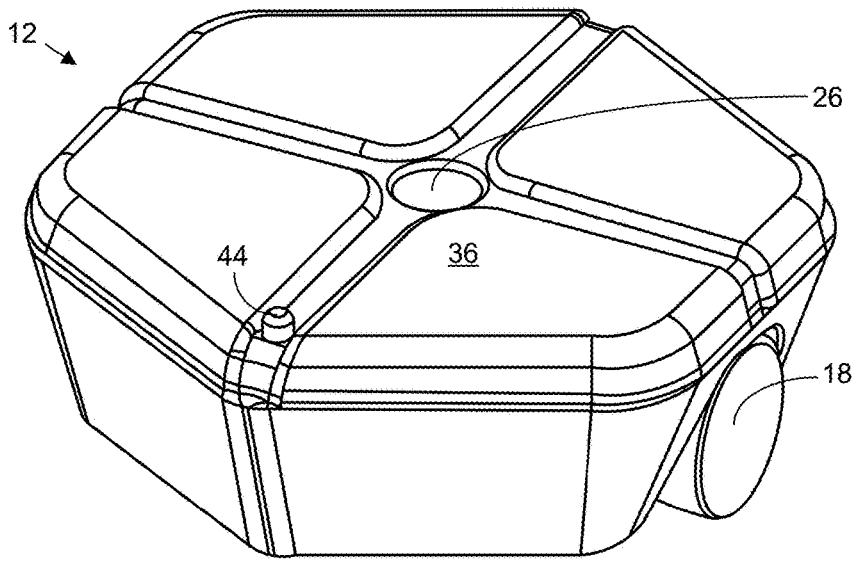
FIG. 3 is a perspective view of another embodiment of the robot.
Figure 4:
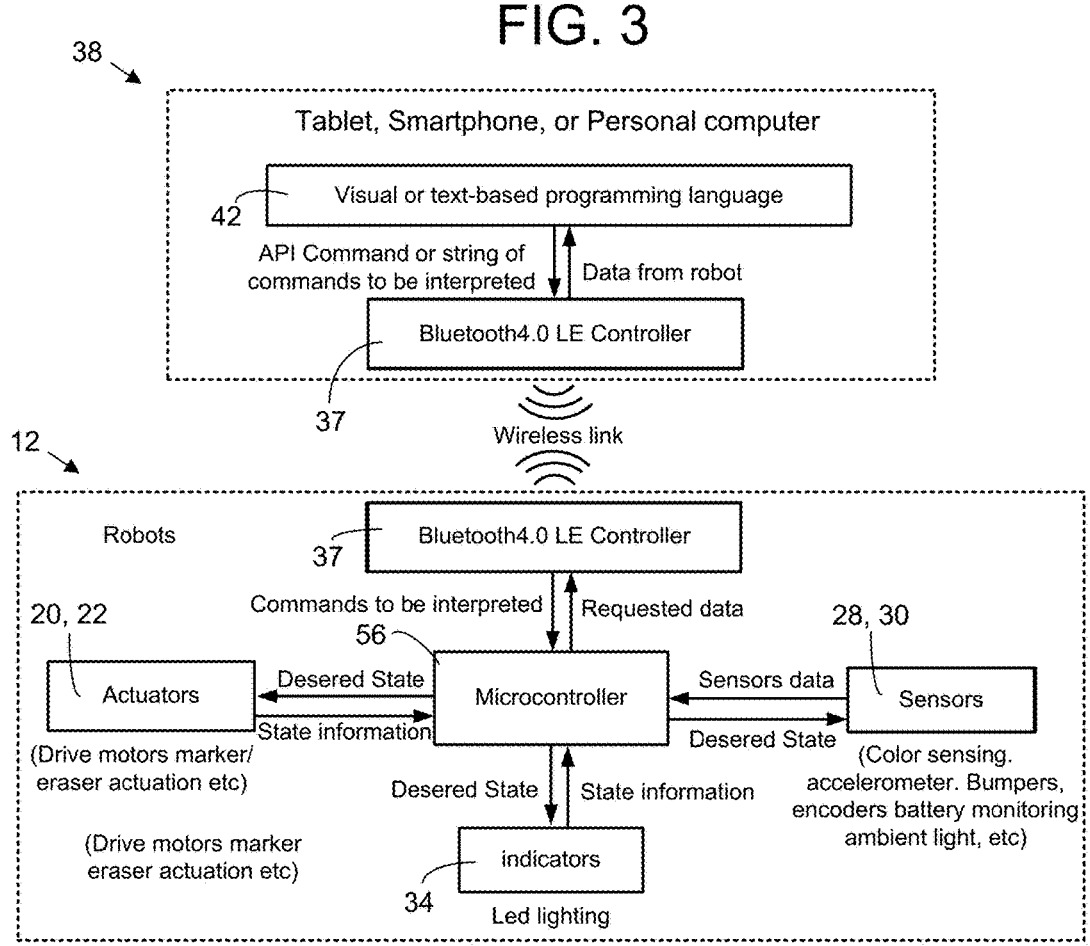
FIG. 4 is a schematic diagram of the robot and control system, showing the communication between components.
Figure 5:
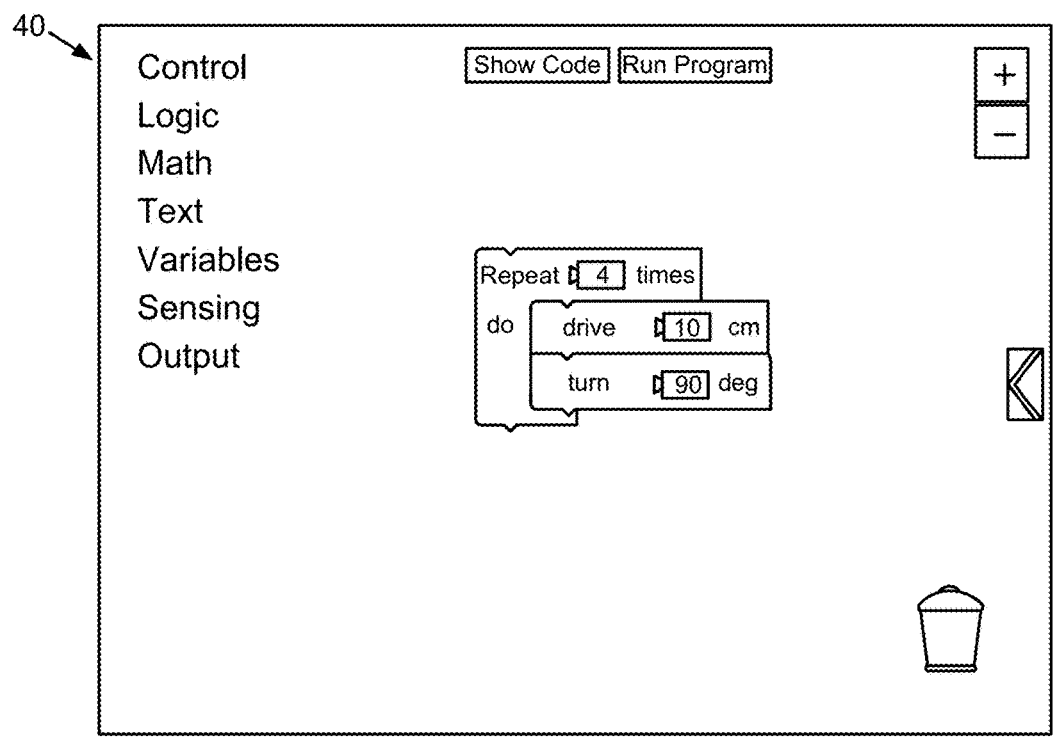
FIG. 5 is a snapshot of an example computer tablet programming interface for the robot.

Features:

Embodiments of a miniature mobile robot can include the following features:

a computing device (e.g., a reprogrammable microcontroller) for managing sensors and actuators and executing higher-level functions;

a Bluetooth 4.0 low-energy wireless link 37 for controlling the robot from an interface 40 (e.g., a graphical user interface, as shown in FIG. 5) on an external device 38, such as a smartphone, tablet, or other computer, as shown in FIG. 4;

two or more magnetic wheels 18 that attach to ferromagnetic materials with enough force to support the robot and create traction on the wheels (in other embodiments, the magnets may be in or elsewhere coupled with the robot body)

the ability to drive on horizontal non-magnetic surfaces;

motors 20 attached to the drive wheels 18 with sufficient torque to drive the robot 12 vertically;

relative position sensors, such as wheel encoders or optic flow sensors, to estimate location and execute precise position commands;

force/current sensing of drive motors 20 to sense motor effort and stalling;

an actuator 22 configured to reciprocally displace a shaft 24 through an aperture 26 (shown in FIG. 3) defined by the robot body;

a marker 14 mountable for actuation by the actuator 22 in an aperture 26 in the robot body at the center of rotation with force control, wherein the actuator 22 can be configured with a force sensor to determine whether the marker 14 is touching the whiteboard or other drive surface 16;

a specialized eraser accessory 15 with a marker-sized shaft 24 that also fits in the aperture 26 of the robot body and that is likewise actuatable by the actuator 22 to reciprocally place the eraser 15 in contact with the vertically oriented surface 16 and to remove the eraser 15 from contact with the vertically oriented surface 16;

the ability to sense whether a marker 14 or eraser accessory 15 is present and to determine color;

an accelerometer to determine orientation when the robot 12 is on a vertical drive surface 16;

a gyroscope sensor to measure angular velocity;

an array of photodetectors 28 on the bottom and/or top of the robot body and configured to sense colors or grayscale patterns drawn on the drive surface 16 (and act as a cliff detector) and/or to detect colors or grayscale images projected onto the robot 12 and onto the drive surface 16;

a light mounted on the bottom surface of the robot body and configured to generate light that reflects off the drive surface for recording by the photodetector array 28;

left and right front bumpers 30 to sense the edge of the drive surface 16;

replaceable batteries 32 (e.g., rechargeable or alkaline);

colorful LED lighting 34;

battery level monitoring;

exposed pins for expansion and reprogramming (i.e., a "hacker port") a magnetic, dry-erase top 36 for customization;

conductive contacts for electrically coupling with a charging station (drive on charging); and support for a variety of programming languages through the open Bluetooth application programming interface (API).

Usage:

The robot 12 can be thought of as a robotic Bluetooth accessory. This allows the device to be very easy to use and takes advantage of the communication and computing power of modern consumer electronic devices 38. Most of the complex processing can be done on powerful processors within the smartphone, tablet, or personal computer used to control the robot 12. Apps on these devices 38 can send commands (or strings of commands) to the robot 12 through a custom Bluetooth API 37. The robot 12 then interprets these commands, updating its sensors 28, 30 and actuators 20, 22 and sending data back to the external device 38 via the Bluetooth API 37.

Figure 8:
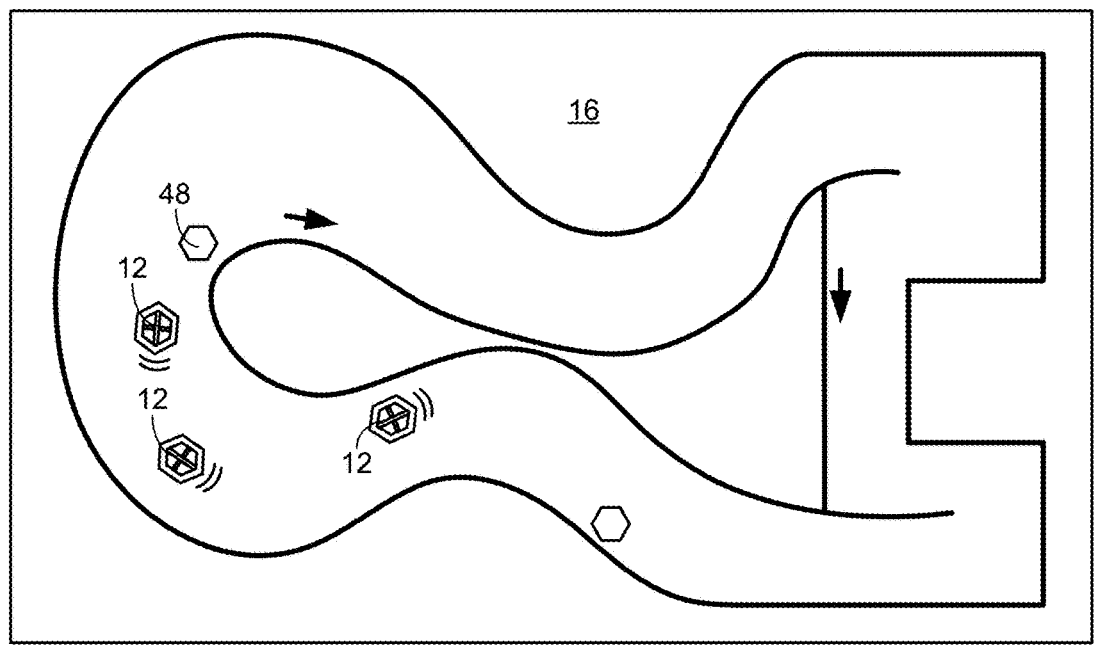
FIG. 8 shows an embodiment of a racing game users can play with multiple robots (controlled by computer-tablet sensors) on a hand-drawn course affected by features (obstacles, "power-ups", etc.) drawn on the surface.

As an example, one can create a driving app (as shown in FIG. 8) for a tablet computer (e.g., an iPad from Apple, Inc.) that uses the tablet's accelerometer and gyroscope for steering. When the app is run on the computing device 38, communication between the computing device 38 and a desired robot 12 is established. The app then uses the iPad's sensors 28 and user input to determine proper wheel speeds and simply sends these desired wheel speeds to the robot 12 to implement by setting corresponding motor speeds.

Interactions/Behaviors:

The robot design, described herein, enables a variety of interesting and unique interactions. Provided below are a few example concepts that have been generated during the development process.

Connection:

For a user to connect to the robot 12 via an external computing device 38, the robot 12 is powered on (and awoken from sleep mode). The connection can then be made via a variety of ways, including the following:

- broadcasting a unique name or ID associated with the hardware that can be selected (or changed) by the user;
- lights 34 on the robot 12 lighting up in a particular (or random) color and the user choosing to connect to the robot 12 with the matching color in the app;
- touching a button or shaking the robot 12 to make the robot transmit its connection information;
- "bumping" the robot 12 and tablet 38 (or other controlling device) together, thereby connecting the two devices based on their having strong accelerations around the same time.

Programming:

Because the robot communicates over an open Bluetooth 4.0 LE or other interface 37, the robot 12 can support a variety of programming languages 42. These languages 42 include visual programming languages (such as Scratch or Blockly) or text-based languages (such as Python, Java, or C). Libraries in different programming languages can be used to send commands or strings of commands over Bluetooth to the robot. Most of the commands can be interpreted by the robot 12 as they are received, but some features can be implemented directly in firmware (for example, stopping the motor 20 when a stall is detected). The robot 12 can also run scripts sent to and stored on the robot 12. In this way, it can be run without needing the Bluetooth master present. The programming environment may also include a simulator for the robot 12 to visualize expected behaviors before running the program on the hardware.

Feedback:

Much of the feedback from the robot 12 can be presented directly on the external device 38 that controls the robot 12 (since the external device 38 will typically be in communication with the robot 12). One can also use onboard lights 34 and sounds as indicators. The following are some examples by which feedback from can be provided by the robot 12:

- the robot 12 lights up and/or makes a sound when it is turned on;
- the robot 12 lights up and/or makes a sound when it connects to a device 38;
- the robot 12 senses insertion of a marker 14 (or an eraser 15), e.g., by activating a toggle switch by sliding a shaft 24 through the aperture 26, and, if a marker 14 is inserted, lights up with a color matching that of the marker 15 (e.g., the shaft can include features, e.g., that are physically or optically detectable by the robot 12 and that are indicative of the marker color);
- the lights 34 of the robot 12 glow the color that the marker 22 is drawing (when the marker is displaced against the drive surface 16 to leave a marking 17);
- the lights 34 of the robot glow a color that uniquely identifies itself (different robots light up in different colors);
- the lights 34 illuminate to match colors sensed under the robot 12 by the photodetectors 28 (providing a transparency effect);
- a light 44 on the robot 12 indicates the state of the robot 12.

Figure 6:
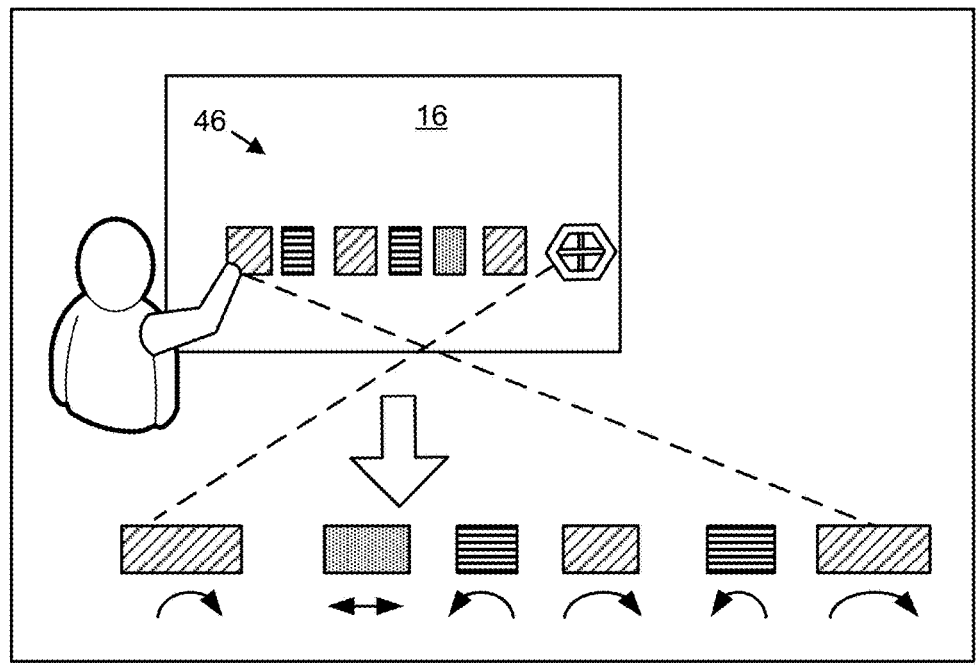
FIG. 6 shows an interface for programming the robot by drawing color patterns on the board, which the robot drives over and scans to determine a sequence of actions to then execute (e.g., to "dance").
Figure 9:
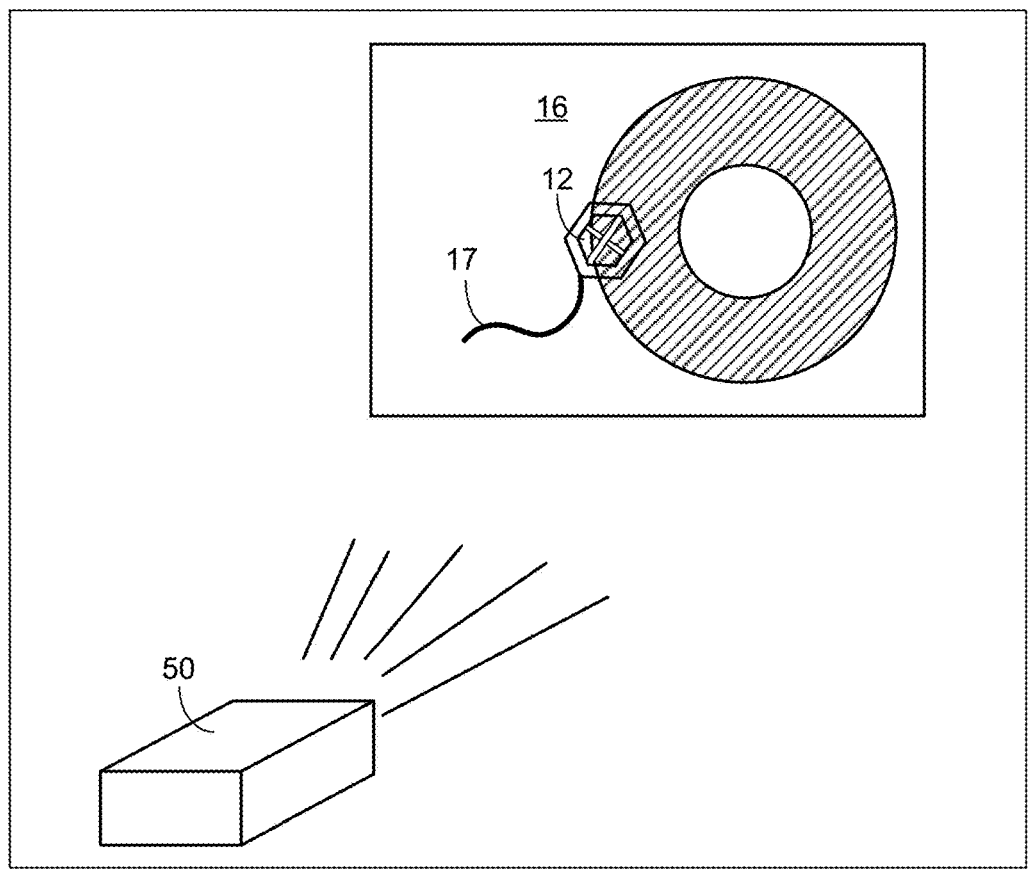
FIG. 9 shows a concept sketch for an embodiment where the robot senses information projected on the whiteboard; this can be treated as non-erasable information or (using a camera or other tracker) can change based on the robot's location and actions.
Figure 10:
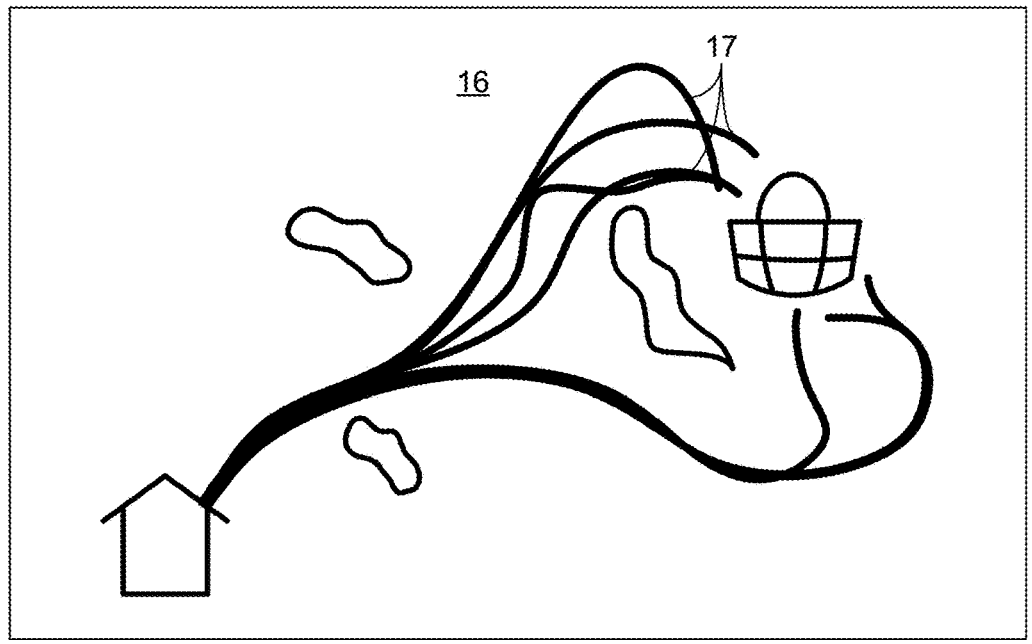
FIG. 10 shows an application where the robot acts as a "robotic ant" on a whiteboard and can forage with multiple robots and simulated pheromone trails.
Figure 11:
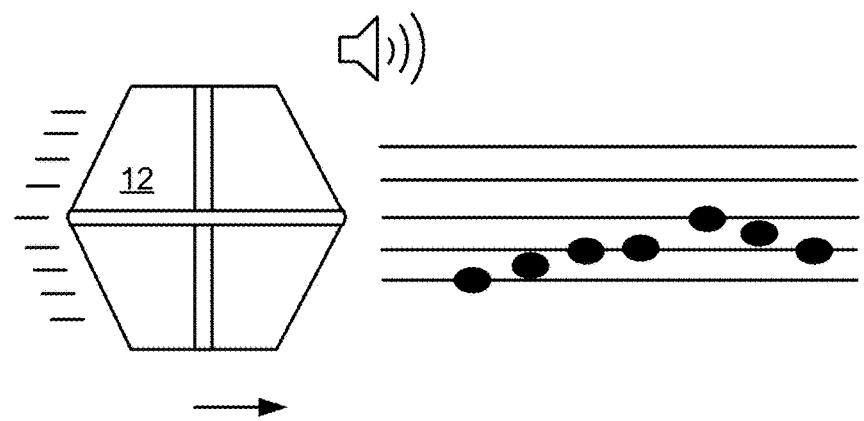
FIG. 11 shows an application where the robot scans musical notes and plays a corresponding song.
Figure 12:
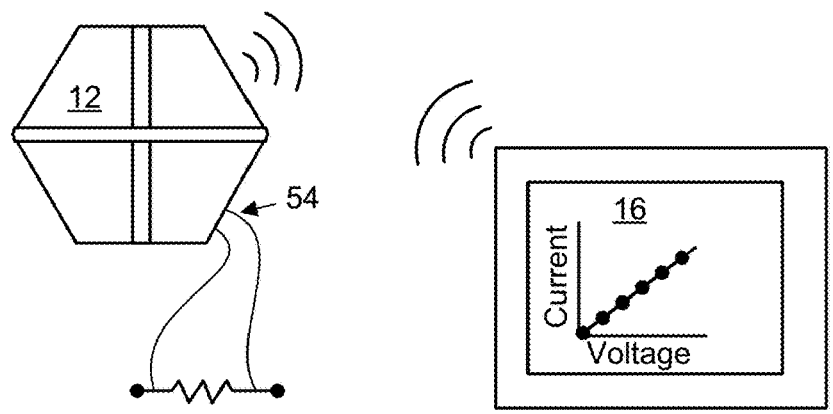
FIG. 12 shows an embodiment where the robot is used as a wireless testing platform through the hacker port to enable other scientific experiments.

Activities:

The following are some example activities or challenges that can be performed with the robot 12:

- programming the robot to dance by drawing colors on the board and using the robot 12 to scan in the color pattern drawn on the board 16, as shown in FIG. 6—students do not even need a tablet or computer to program behavior;
- using the robot 12 to simulate projectile motions (as shown via the dashed line in FIG. 7), where users can change the launching power, mass of the projectile, or gravity;
- playing a game where the robots 12 race (controlled, e.g., by iPad sensors) on a hand-drawn course, and where the robots 12 can be affected by "power-ups" 48 drawn on the surface 16, as shown in FIG. 8;
- the robot 12 sensing information projected on the whiteboard 16 by a projector 50, as shown in FIG. 9, wherein the information can be treated as nonerasable information or (using a camera or other tracker) can change based on the robot's location and actions;
- robotic "ant" foraging with multiple robots and markings 17 from the robots 12 functioning as pheromone trails, as shown in FIG. 10;
- robot 12 scanning musical notes, as shown in FIG. 11, and playing the corresponding song;
- using the hacker port 54 to enable other scientific experiments, which can be projected on a display 16 via wireless communication from the robot 12, as shown in FIG. 12;
- exploring and mapping environments;
- scanning what is drawn on a surface;
- optimal cleaning algorithms (for cleaning the whiteboard with the eraser); and
- playing a "snake" or "Tron-like" game.

In particular, the robot 12 can use an array of color sensors 28 on the top and/or bottom of the robot 12 to detect color patterns 46 on the vertical surface 16 and/or projected onto the robot 12 and actuating the actuator 22 (to apply or remove the marker 14 or eraser 15 to/from the underlying surface 16) in response to and as a function of the measurements from the color sensor 28. This capability facilitates a wide variety of interactive activities involving color markings 17 on a whiteboard 16.

Lessons:

In order to ease adoption in the classroom and provide tangible learning goals, the robot 12 is designed to facilitate lessons based on state and national standards.

For example, in science, the robot 12 can be used to facilitate lessons based on color and additive light; pitch/tone; forces; magnets; gravity; position, velocity, and acceleration; measurement; biological systems; and the scientific method.

In technology, the robot 12 can be used to facilitate lessons based on sensors; programming (functions, recursion, debugging, etc.); motors; computers; circuits; and voltage and current.

In engineering, the robot 12 can be used to facilitate lessons based on control; feedback; robotics; communication systems; the engineering process; and problems solving challenges.

In math, the robot 12 can be used to facilitate lessons based on geometry and shapes; variables; units; averaging; fractions; filters; and logic.

Technology:

Microcontroller:

The robot 12 uses a microcontroller 56 (shown in FIG. 4) for managing sensors and actuators and for executing higher-level functions. The microcontroller 56 includes input/output peripherals; memory that nontransitorily stores computer-executable software code for, e.g., displacing the robot and actuator in response to and as a function of measurement from the sensors; and a processor in communication with the memory and the input/output peripherals. The microcontroller 56 communicates with a Bluetooth wireless module 37 to receive commands or scripts sent from an external controller 38, such as a smartphone, tablet, or computer using a custom API. The API allows external programs to read and write sensor and actuator settings and data. Firmware can be updated on the device through a specialized connector and/or through the Bluetooth connection 37. The microcontroller processor also receives data received from the sensors 28, 30 and issues commands that are communicated to, e.g., the motors 20 driving the wheels and the actuators 22 that actuate the marker 14 or eraser 15.

Wireless Connection:

Users can connect with the robot 12 on a smartphone, tablet, or personal computer using a Bluetooth 4.0 low-energy connection 37. This technology is built into many modern devices but can also be added through a USB stick or other accessory. The technology is optimized for simple, low-energy communications, allowing the hardware to be cheap and allowing the communication protocol to be relatively simple. Users can search for nearby robots 12 and connect to one (or multiple devices). Note that a single robot 12 typically only connects to a single controlling device 38 at a time. Once connected, the controlling device 38 can send commands or scripts for the robot to execute. As an exemplary interface, one can use a touch-based visual programming language 42 that runs on an iPad or other tablet computing device 38 to control the robot 12.

Figure 13:
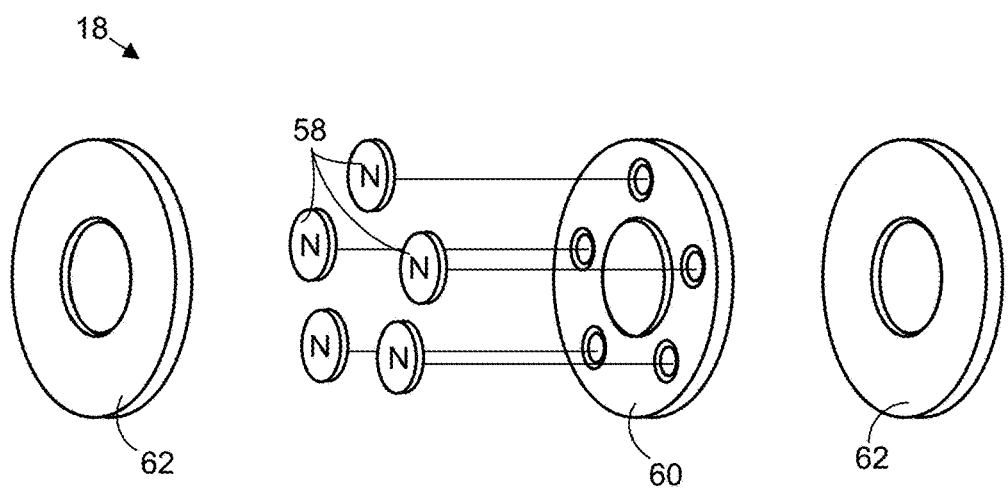
FIG. 13 is an exploded view of a magnetic wheel design.
Figure 14:
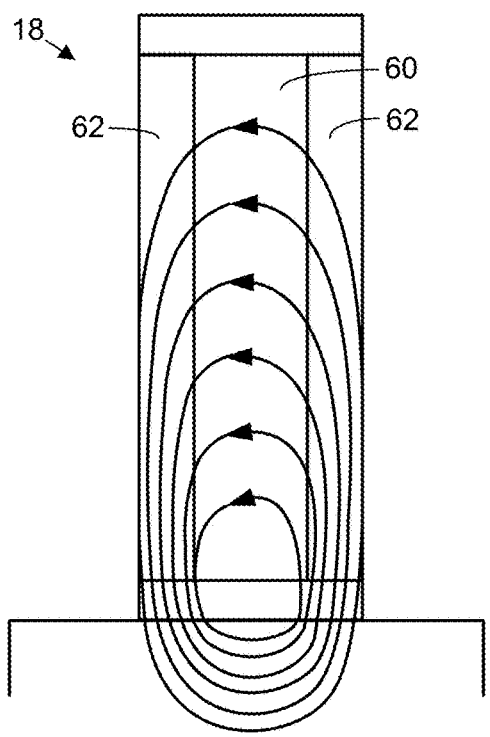
FIG. 14 is a diagram showing magnetic field lines through the wheel of FIG. 13 and through a ferromagnetic surface.

Magnetic Wheels:

The robot 12 is able to attach to ferromagnetic surfaces 16, such as whiteboards, with two custom magnetic wheels 18, as shown in FIGS. 13 and 14. Permanent magnets 58, such as neodymium rare-earth magnets, are held in place in a low-cost and easy-to-manufacture plastic hub 60 with apertures 61 for containing the magnets 58. Metal plates 62 are placed on both sides of the wheel and are magnetically held in place by the magnets 58. These metal plates 62 guide the magnetic field lines to form a magnetic circuit (through the wheels and driving surface) that causes strong attachment at the wheels 18, as shown in FIG. 14. The number and position of the magnets 58 can be adjusted to change the attractive force. The wheel can also include a tire about the perimeter of the plastic hub 60 for improved traction. The tire can be made of a compressive material (e.g., a non-slip polymer) that improves traction and avoids scratching the drive surface 16. Changing the thickness of the tire also changes the attractive force of the magnetic wheels 18. The wheels 18 can be used on whiteboards, blackboards, other ferromagnetic surfaces, or on flat and horizontal non-magnetic surfaces. The wheels are powered by two electric motors 20 with sufficient torque to drive the robot 12 vertically. These motors 20 can also include gearing to optimize speed/power consumption and encoders for precisely estimating location and speed.

Slippage Sensing and Mitigation:

One of the problems inherent with driving on vertical surfaces is accounting for gravity. In particular, the robot's tires may slip or stretch causing the robot to move in unintended ways. This corruption can manifest itself as downward drift or unintended rotation (when a single wheel 18 slips more than the other). The robot 12 may include a variety of features to help mitigate this slippage. Examples of these features include weight reduction, adhesion strengthening, and feedback from the environment.

Adhesion strengthening can take several forms, such as the following:

increasing the number or size of magnets 58;
using stronger magnets 58;
optimizing the magnetic circuit;
adjusting the tire material, shape, and/or hardness;
cleaning the drive surface 16 before the tire makes contact, thereby preventing dust and dirt buildup on the tire; and
tire cleaning mechanisms.

Active methods for slippage mitigation use environmental information to account for differences between desired and observed motion of the robot 12. Some strategies include:

building a model of the expected slippage under various environmental conditions, such as the robot's orientation relative to gravity; the robot 12 adjusts its motion to compensate for an estimated amount and direction of drift;

measuring relative motion between the robot 12 and drive surface 16 using sensors on the robot 12; these sensors may be optical (such as the optic flow sensors found in computer mice) or mechanical (such as ball casters with sensors to measure speed and direction of the ball, similar to a trackball, which is kept in contact with the drive surface 16); these sensors track the robot motion directly, allowing closed-loop speed control and measurement of motion perpendicular the wheel direction; slippage perpendicular to the drive wheels 18 is compensated for via a navigation and path planning system; the robot 12 can use more of these sensors to help filter the information and better estimate its true motion;

tracking of the robot 12 using external sensors; sensors external to the robot 12, such as a camera or other calibrated tracking system, can be used to determine the position, direction, and motion of the robot 12 on the drive surface 16; this information can be returned to the robot controller 38 so that the motion planning can be updated to account for measured slipping; advantageously, a camera may also be used to determine the precise position of the robot 12 in the environment (e.g., for navigation tasks) and to estimate the size of the objects in the environment (e.g., using the robot as an object of known size);

tracking of landmarks on the drive surface 16 by the robot 12; these landmarks may be inherent to the drive surface 16 (e.g., changes in color) or added by the user (e.g., a dot pattern added to the surface 16); known landmarks, when seen by the robot 12, can be used to update the robot's position estimation in its environment using simultaneous localization and mapping (SLAM) techniques; and using beacons around the environment that the robot 12 can detect to triangulate its position; the beacons may use light and/or sound and can be active or passive; using directional and/or signal strength information, the robot 12 determines its position on the driving environment and accounts for discrepancies between the desired and measured positions.

Figure 15:
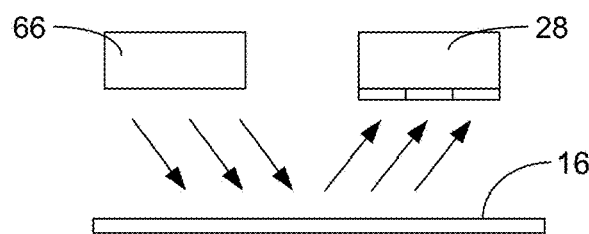
FIGS. 15 and 16 show two different color sensing methods, where the array of photodetectors can be placed close to the detecting surface, or where optics can be used to guide the light to the sensor.
Figure 16:
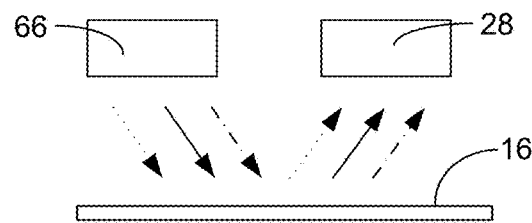
Figure 17:
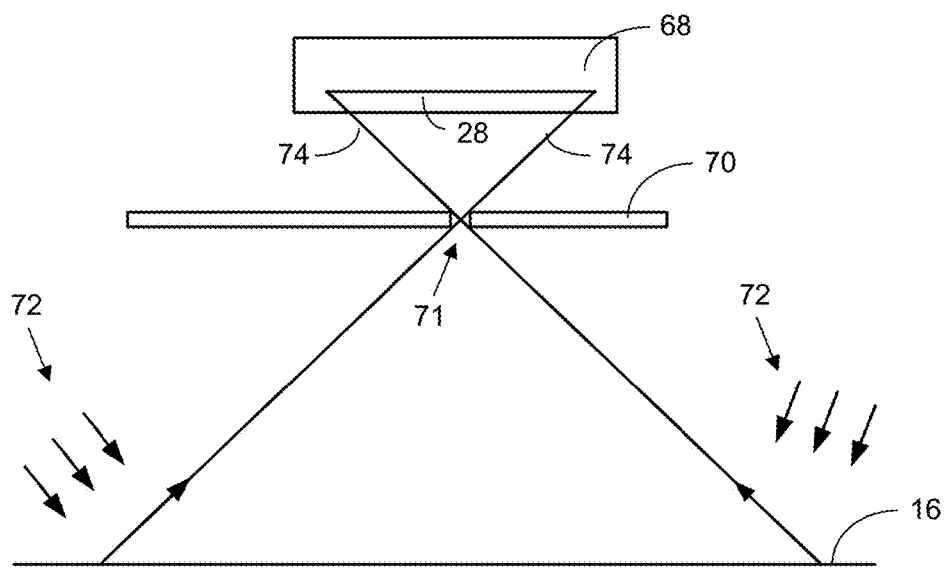
FIG. 17 shows that a linear camera in the robot can be used with a slit (like a pinhole camera) or a lens to sense a larger surface area of a whiteboard. Additionally, one can use an external light source (e.g., a projector, a monitor, etc.) that displays different color combinations to communicate with the device.
Figure 23:
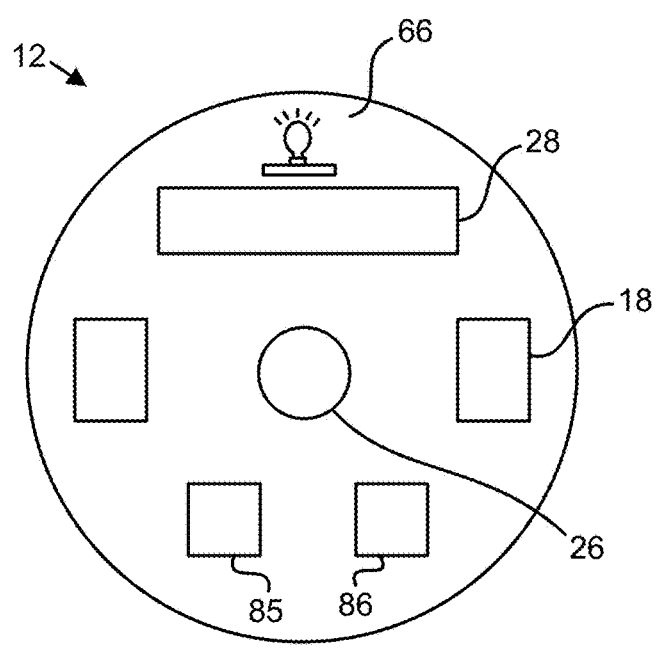
FIG. 23 is an illustration of the underside of an embodiment of the robot showing a light and sensor array for detecting color patterns on a surface traversed by the robot.

Color Sensing:

The robot 12 can sense colors 46 on the drive surface 16 using an array of photodetectors 28. These sensors 28 (or similar sensors) can also be used to detect a "cliff" or edge of the drive surface 16. The photodetectors 28 can use a light source 66 (e.g., a LED) and a color or grayscale sensor 28, as shown in FIGS. 15, 16, and 23. In particular embodiments, the sensors 28 detect colors by using either a white light source and color filters or colored light sources (such as red, green, and blue LEDs) and an unfiltered (or IR-filtered) sensor. By measuring how the light changes when it is reflected from the surface 16, the color can be determined. For example, a green mark on the surface 16 would absorb more red and blue light while reflecting more green light. The sensors 28 can be calibrated to associate incoming light to a perceived color. The marker inks may also be adjusted to help the robot distinguish between different markers (e.g., by making a special light green ink absorb significantly more infrared light than a dark green marker).

As shown in FIGS. 15 and 16, the array of photodetectors 28 can be placed close to the detecting surface or can use optics to guide the light to the sensor 28. The sensor 28, itself, can be made of discrete components or from a pre-assembled array of photosensitive units (such as an imaging chip). The array can be in the form of a line, a box, or any other shape (such as a V-shape in one prototype).

In one embodiment, a linear camera 68 is used with a screen 70 that defines a slit 71 (like a pinhole camera) or lens. Controlled light 72 of a known color is reflected off of the drive surface 16 (non-controlled light sources should be blocked). Some of the reflected light rays 74 pass through a small slit 71 (or other optics) and reach a part of the photosensitive array 28 based on where they originated on the surface. The distance between the slit 71 and camera 68 (or other optics) determines the area that will be measured. This provides a simple and compact way to scan in the surface. Note that reflected the light 74 can travel through air or another transparent medium (such as glass or acrylic) to reach the slit 71 and camera 68.

Another interesting use of these types of sensors 28 is to use them to reprogram the robot 12. One can use an external light source (e.g., a projector, a monitor, etc.) and use different color combinations to communicate with the robot 12. For example, the robot 12 can be placed on a computer tablet screen. An app on the computer tablet then displays a series of multicolored barcodes corresponding to particular hex values. This string of hex values forms the program to be run on the robot 12.

Figure 18:
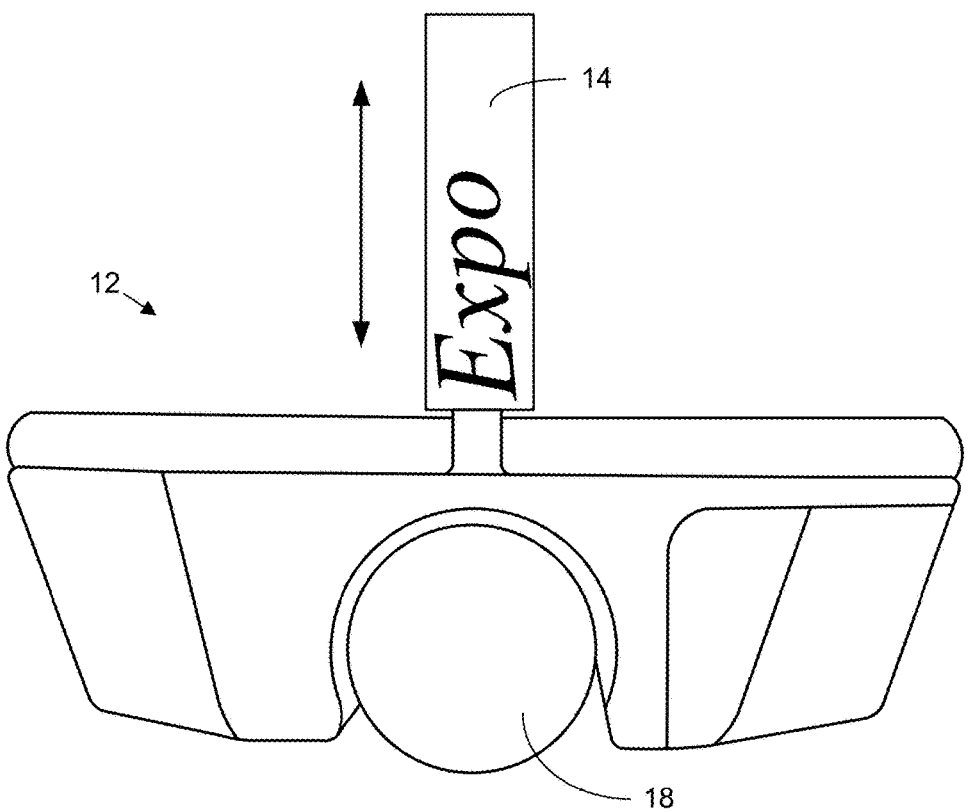
FIG. 18 is an image of an actuated marker on an embodiment of the robot.

Actuated Marker:

To manipulate the driving surface and to enable a variety of new interactions, the robots 18 are provided with an actuated marker 14, as shown in FIG. 18. The marker 14 is located at the robot's center of rotation so that, if the robot 12 turns in place (e.g., if the two wheels 28, which are equally and oppositely spaced from the center point of the aperture/marker, are spun at equal rotation rates in opposite directions), it turns about the tip of the marker 14 and only leaves a dot. The aperture 26 for the marker 14 and associated features can have the following attributes:
  located at the center of rotation;
  fits a standard whiteboard (e.g., EXPO) marker and may be size-adjustable for other markers;
  can identify when a marker 14 or eraser 15 is present and can identify the color;
  can sense when the marker 14 is drawing;
  can be force controlled (e.g., an eraser 15 can be applied with more force than a marker 14);
  can have multiple locking states (e.g., marker up and down); and
  a spring or other mechanism can provide a constant and known contact force.

One implementation of the actuator 22 uses a compressible roller, as shown in FIG. 19, to apply pressure and grip the marker 14 to move it. Other embodiments can include mechanisms with two or more steady states (e.g., marker 14 lifted/down or different contact forces) that require little or no energy to maintain. The actuator 22 can also wind a spring or other device to adjust the force when drawing or erasing.

Eraser Accessory:

The robot 12 can include a specialized eraser accessory 15 that the robot 12 can actuate in the same way as it does a regular marker. The eraser accessory 15 can include a pad 76 of erasing material (e.g., felt) connected to a marker-sized shaft 24. This shaft 24 can be inserted into contact with the marker actuator mechanism 22 in order to selectively apply force and erase a dry-erase surface 16.

Embodiments of the eraser 15 can include the following:
  a layer of compressive foam material 78 connected to the erasing material 76 to ensure even pressure and a controlled contact force;
  a modified shaft shape for improved grip by the robot 12 and/or to prevent rotation (e.g., a D-shaped shaft or a shaft with ribs);
  textured surfaces to improve connection with the robot;
  additional shafts for alignment and/or additional force;
  a rack and pinion-like mechanism; and
  springs in the shaft 24 to control the force applied.

Customizable Case:

The top surface 36 of the robot 12 can be a magnetic and/or dry-erase whiteboard surface so that children can customize the robot 12, as shown in FIG. 21. This customization is particularly advantageous for younger users who are often more motivated by challenges involving characters and personalized interactions. The top surface 36 of the case can support ink from standard dry erase markers and small magnetic attachments. Potential magnetic attachments include the following:
  magnetic covers with different designs;
  magnetic accessories that allow building with LEGO-compatible bricks;
  attachments for additional motors; and
  additional sensors or breakout boards.

Note that the top surface 36 of the case is provided with a non-conductive area through which wireless signals can pass. In additional embodiments of the case, the tope surface 36 of the case acts as a large button actuator. This actuation via the case can be mechanical or by sensing changes in capacitance.

Hacker Port:

The robot 12 can have several power and I/O pins 54 available to the user that can also be controlled over Bluetooth communication to allow users to add their own sensors and/or actuators, thereby enabling the platform to be expanded upon and even used as a mobile platform for other scientific experiments.

Figure 22:
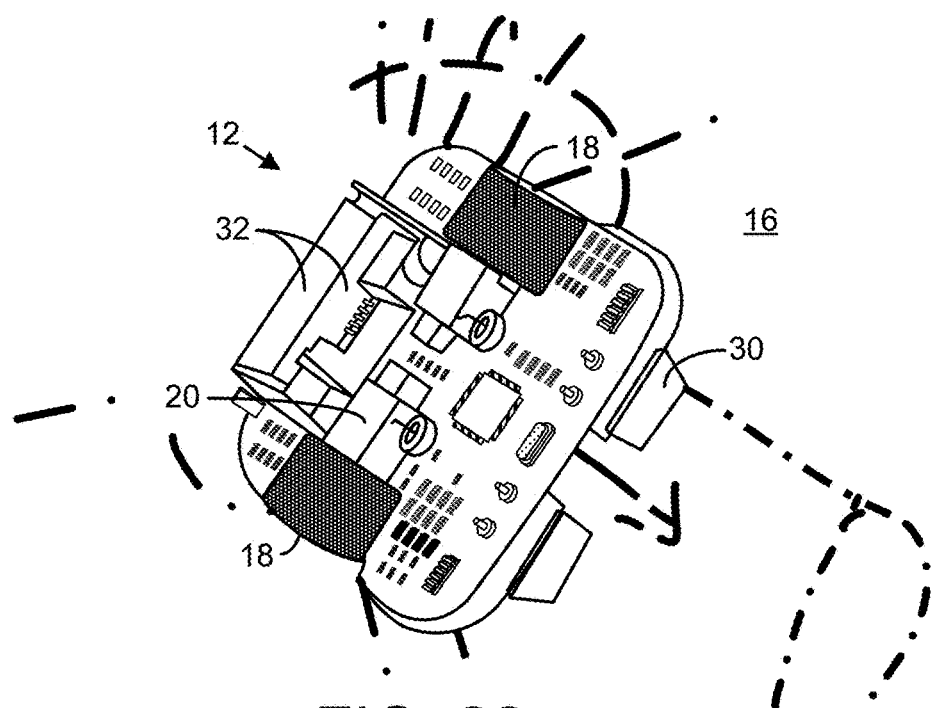
FIG. 22 shows a first prototype of the robot, which has permanent erasing pads and which does not have an actuated marker.

Batteries:

The robot can be powered by batteries 32, as shown in FIG. 22, which can be based on most common battery chemistries. The design also supports specialized battery packs that can be easily swapped out (and even based on different battery technologies from one another).

Figure 7:
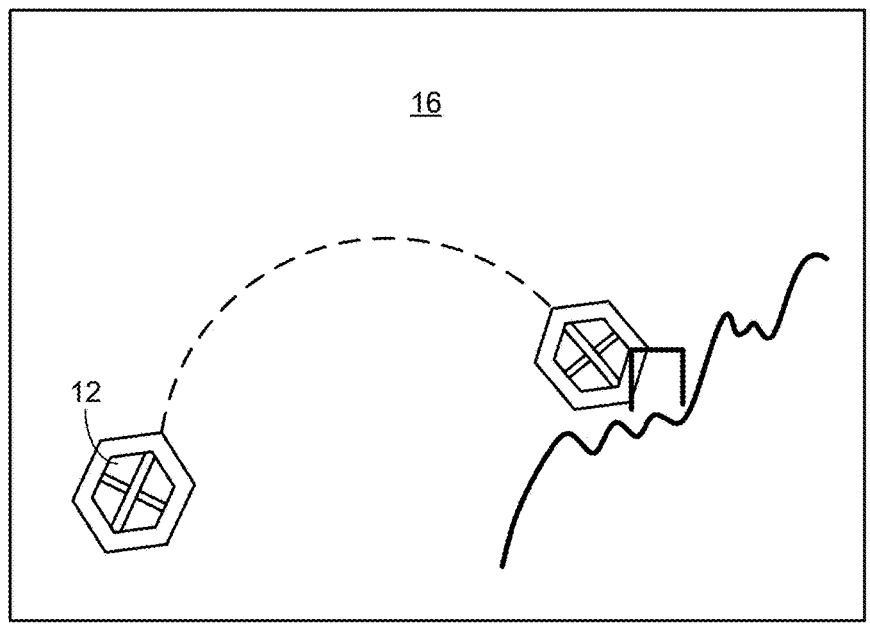
FIG. 7 shows a projectile motion simulation, where the robot performs as the projectile, and where users can change the launching power, mass of the projectile, or gravity.

Classroom Use and Scannable Textbooks:

To ease adoption of lessons into classrooms, a system-level embodiment can be deployed, where traditional textbooks have scan-able codes printed in the textbook (e.g., QR Codes) that acts as a trigger to inform the robot what type of demo or lesson to give. For instance, a teacher/student scans a code for a physics trajectory problem (as shown in FIG. 7); a smart device (external controller 38) identifies the scan, loads the instructions for that scan from an external offline or online database; and the controller 38 transfers the lesson program to the robot. The robot 12 can then draw the learning material on the whiteboard and creates its own interactive demo for students specific to the scan. Teachers can utilize robot interaction demos by just scanning a text book, making the barrier to robot demos very simple. A practical example can also be in math where the robot plots graph solution on the board.

External Event-Action Control:

In another embodiment, drag-and-drop-based programs are used that are triggered by linking 'events' and 'actions'. An 'event-action' relationship creates a 'rule'. Rules are ordered and can be reordered to allow the robot 12 to know which rules take priority. Rules with the same priority number can be run in parallel together. A collection of a plurality of rules becomes a 'behavior'. A 'behavior' can be saved and re-loaded back into the programming environment as an 'action'. For example, a 'behavior' wherein a robot 12 is made to follow a line on the drive surface 16 can be an 'action' that is triggered by an 'event' (e.g., a smart phone serving as an external controller 38 is shaken back and forth). Furthermore, this embodiment demonstrates that events are not just limited to the sensors on the robot, they can include events from the external controller 38 (screen touch, microphone input, accelerometer info, camera image capture, timing functions, or any other sensing modality). These programs can be stored as software code on a computer-readable medium and executed by a computer processor in the controller 38; the actions generated by the processor upon executing the code can then be transmitted via a wireless transmitter in the controller 38 to a wireless receiver in the robot 12 for execution.

Figure 27:
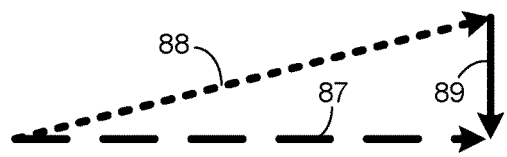
FIGS. 27-29 show some examples of trajectory corrections that are made to account for a given amount of drift 89.
Figure 28:
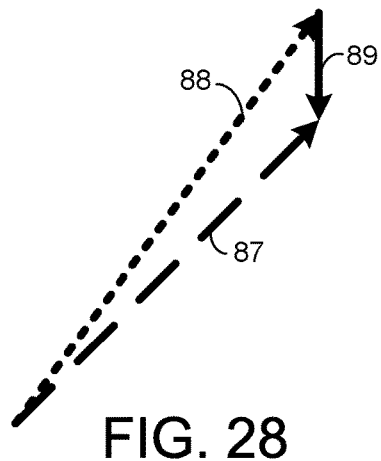
Figure 29:
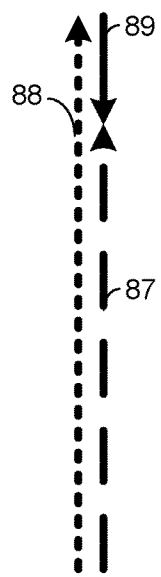

Trajectory Based Driving w/ Magnetic Receptive Sensor:

In particular embodiments, the whiteboard 16 (or other driving surface) can be constructed with a ferromagnetic material, such as iron, e.g., as a backing. The following discussion (and other sections in this description) is directed to embodiments where a whiteboard is used as the drive surface 16, though it likewise applies to other driving surfaces that include a magnetic or magnetizable composition. A whiteboard of this type, which is widely referred to as a "magnetic" whiteboard, is highly susceptible to magnetization, causing permanent magnets to be attracted to it. The type and thickness of the whiteboard backing material influence the magnitude of the attractive forces from the permanent magnets 58 in the robot 23 (e.g., in the wheels 18 of the robot 12, as shown in FIG. 13). These changes in attractive force, in turn, affect the amount of drift the robot experiences when driving on vertical (or partially vertical) surfaces; exemplifications of drift 89 of the robot 12 as a function of the robot path 88 and the intended path 87 are illustrated in FIGS. 27-29. In general, boards that are more magnetically receptive produce less drift 89. This drift 89 is caused by deformation and slipping of the tire material due to gravitational forces acting parallel to the drive surface 16 and is related to the slip angle of the wheels 18 (the angle between a rolling wheel's direction of travel and the direction that the wheel 18 is pointing).

Figure 24:
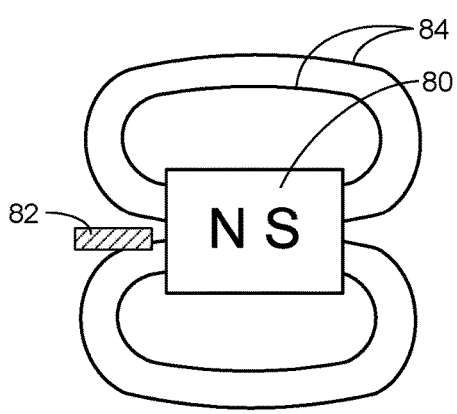
FIGS. 24-26 show the use of a magnetic force sensor (comprising a permanent magnet 80 and a Hall effect sensor 82) that measures the magnetic susceptibility of the drive surface 16 to estimate the attractive force and the resulting drift 89 of the robot 12.
Figure 25:
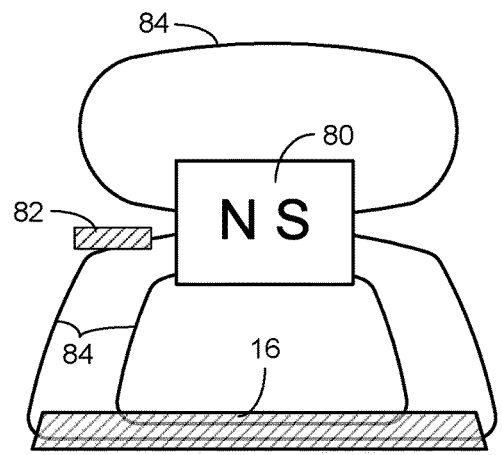
Figure 26:
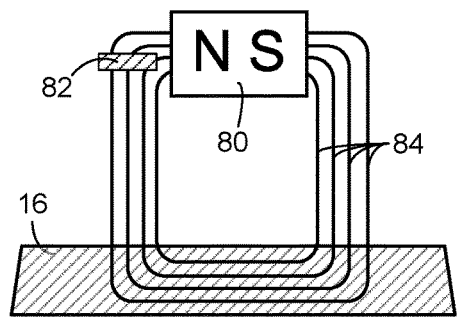

Because the drift 89 is directly related to the magnetic receptiveness of the drive surface 16 (given a constant robot weight and arrangement of permanent magnets), one can use a magnetic force sensor, comprising a permanent magnet 80 and a Hall effect sensor 82 (shown in FIGS. 24-26), that measures the magnetic susceptibility of the drive surface 16 [i.e., the magnetic field 84 generated via the permanent magnet(s) 58/80 and the drive surface 16] to estimate the attractive force and the resulting drift 89 of the robot 12. The embodiment of FIGS. 24-26 uses a permanent magnet 80 and the Hall effect sensor 82 in the robot 12 to measure the magnetic susceptibility of the drive surface 16. In this configuration, a drive surface 16 that is more magnetically receptive causes the magnetic field 84 to change direction and concentrate through the sensor 82. An increased magnetic-field reading from the sensor 82 corresponds to a greater attractive force and less drift 89.

One can then correct for drift using an experimentally determined relationship between the amount of drift 89 on the drive surface 16, the magnetic susceptibility of the drive surface 16 (measured using the magnetic force sensors 82), and the force vector due to gravity (measured using an accelerometer). For example, one can measure actual drift 89 observed under particular conditions (e.g., when driving on a particular magnetic whiteboard) and then compensate for that observed drift 89 in the driving commands sent to the motors 20 that control drive and steering under similar conditions. The correction can be made via a computer processor/controller 56 ("processor" and "controller" are used interchangeably herein) onboard the robot 12 (or in remote communication with the robot 12) executing computer software code non-transiently stored in computer-readable memory in communication with the processor and including one or more algorithms for increasing the magnitude of the drive or turning command communicated to the motor/steering mechanisms when the sensor 82 measures a reduced magnetic force 84 between the magnet 80 and the drive surface 16, which is also fed to the processor 56. In particular, for the robot 12 to drive along a desired trajectory 87, it must adjust the heading and drive distance to account for the drift 89. The images of FIGS. 27-29 show some examples of trajectory corrections that are made to account for a given amount of drift 89. Note that the drift 89 occurs continuously and is always in the direction of gravity in this embodiment.

The robot 12 knows (i.e., its processor 56 can determine) its heading using an onboard accelerometer 85 and angular rate sensor 86, as shown in FIG. 23, with gravity providing a known heading that is communicated to the processor 56. In general, the robot 12 adjusts the heading 88 (turning away from the gravity vector) and distance (either through wheel speed or time corrections) to counteract the effects of drift 89. This correction can be continuously running on the robot 12 so that when the robot 12 attempts to drive in any given direction 88 relative to gravity, the processor/controller 56 adjusts its speed and heading accordingly. Note that one can also use other sensors or methods, such as using a camera or experimental measurement routine, to help determine the amount of drift 89 to help the robot 12 estimate and correct for drift 89.

The pen 14 ("pen" and "marker" are used interchangeably herein) can advantageously be positioned at the center of rotation of the robot 12. The eraser 15 can be located off-center at the rear of the robot 12 so that turning the robot 12 while erasing does not accidentally erase material in front of the robot 12.

Figure 30:
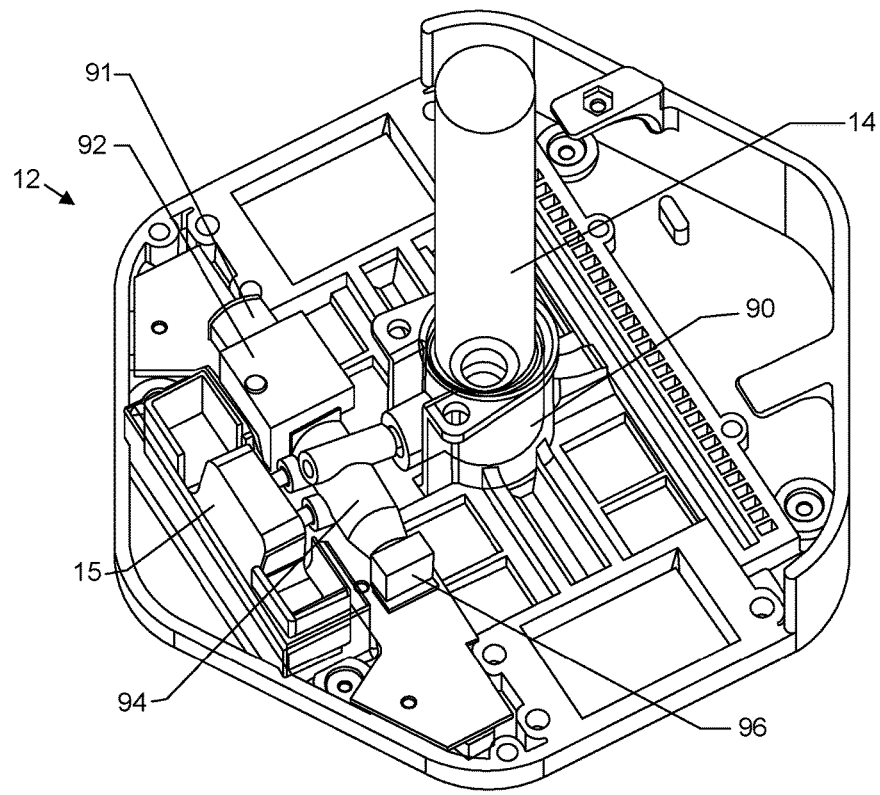
FIGS. 30 and 31 show a a double-ended actuator arm 94 with a first end 95 connected to a marker holder 90 and with a second end 97 connected to an integrated eraser 15 through compliant joints 98 and configured to actuate a pen 14/eraser 15 pair through three states (pen up/eraser down, pen up/eraser up, pen up/eraser down) using a single actuation motor 91.

In order to simplify control and avoid a need for additional actuators, a mechanism, shown in FIG. 30, was devised to actuate a pen 14/eraser 15 pair through three states (pen up/eraser down, pen up/eraser up, pen up/eraser down) using a single actuation motor 91. The mechanism employs a double-ended actuator arm 94 with a first end 95 connected to a marker holder 90 and with a second end 97 connected to an integrated eraser 15 through compliant joints 98. As the actuator arm 94 is rotated by the actuation motor 91, the compliant joints 98 are moved in approximately linear fashion. The eraser 15 and marker holder 90 have integrated bearing surfaces that interface with features on the robot chassis to guide true linear motion. An angle sensor detects the angle of the actuator arm 94.

Figure 31:
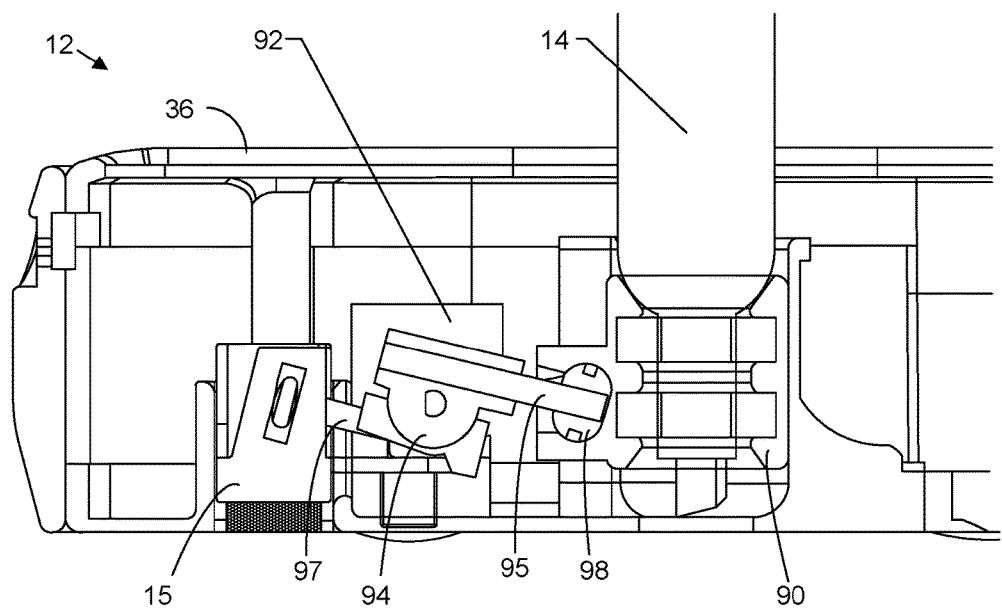

The actuator arm 94 actuates the pen 14 and eraser 15 through three states via rotation of the actuator arm 94. The actuator arm 94 is in a neutral position (with the pen 14 and eraser 15 both removed from the drive surface) in FIG. 31. With clockwise rotation driven by the rotary actuation motor 91 to which the actuator arm 94 is mounted (at an axial pivot point), the first end 95 of the actuator arm 94 rotates to push the pen 14 down (in the orientation shown) into contact with the drive surface 16 to mark the drive surface 16 while the eraser 15 is retracted (by the second end 97 of the actuator arm 94) away from the drive surface 16. On the other hand, the actuator arm 94 can be rotated counter-clockwise to push the eraser 15 into contact with the drive surface 16 to erase pen markings on the drive surface 16 while the pen 14 is retracted away from the drive surface 16.

Figure 32:
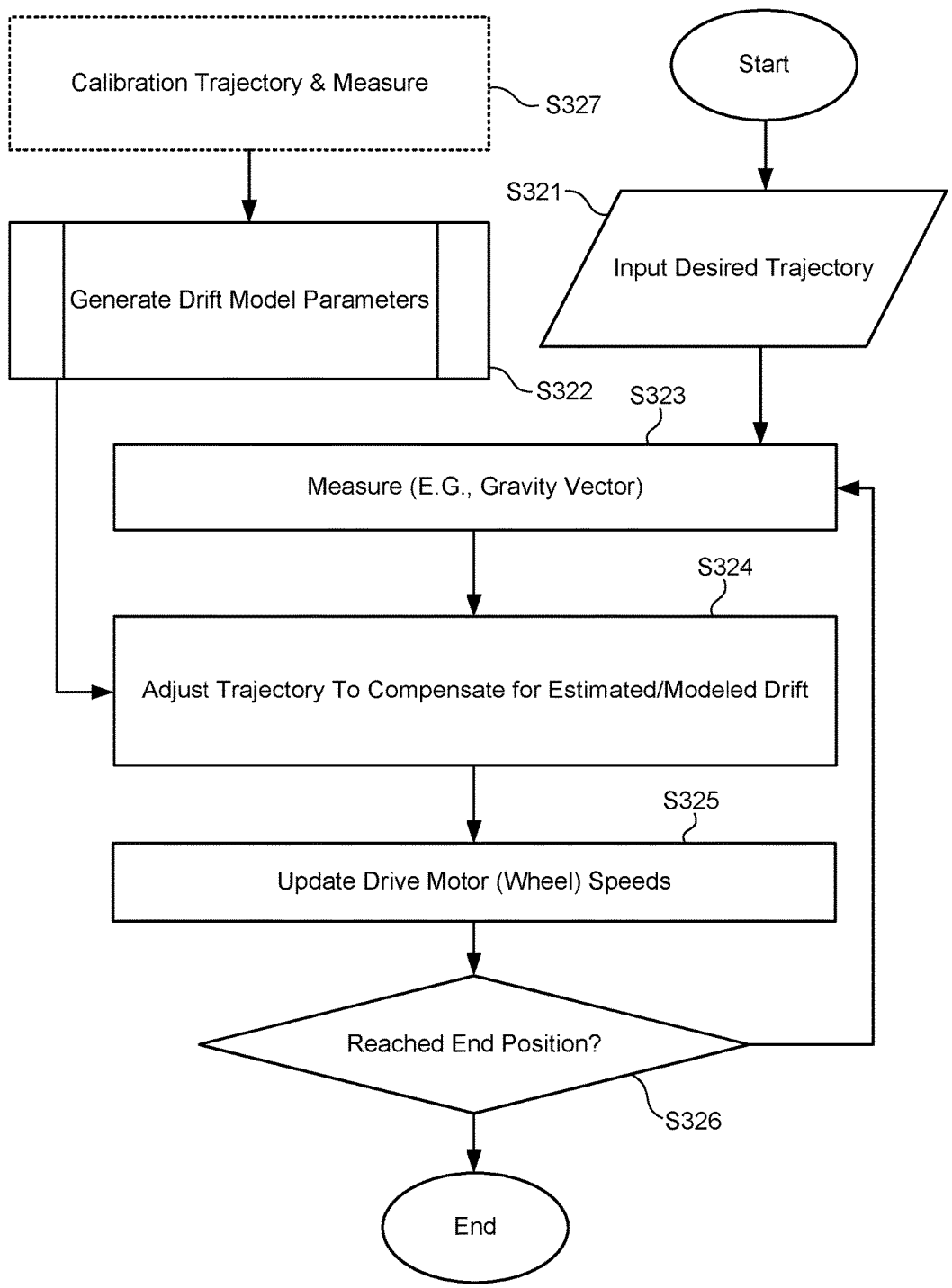
FIG. 32 is a flowchart describing a process for calibrating, correcting, or otherwise adjusting for wheel/drive slippage caused by the continual force of gravity in one of the driving directions.

FIG. 32 is a flowchart describing a process for calibrating, correcting, or otherwise adjusting for wheel/drive slippage caused by the continual force of gravity in one of the driving directions.

The robot 12 can employ a method of compensating for drift 89 caused by gravity while driving on vertical surfaces 16 that works by adjusting the desired trajectory 87 slightly to account for drift 89 (e.g., using an estimate of drift). The amount of drift 89 varies from surface to surface due to the magnetic receptiveness of the surface material and the direction of the gravity vector (e.g., drift 89 is less on partially vertical/angled boards), as well as by wear upon the wheels 18 or drive, manufacturing variation in the wheels 18 or drive, surface texture or coefficient of friction, and/or potentially from relative humidity and temperature affecting material properties of the wheels 18, drive, or surface 16. The final behavior of the robot 12 can, therefore, be improved by calibrating the drift response of the robot 12 for a particular drive surface 16, environment, and/or robot 12. These calibration values can be updated by hand, measured by the robot 12 using a calibration routine or estimated based on a measured magnetic force between the robot 12 and the drive surface 16. The drift correction allows for more precise drawing on whiteboard surfaces.

As described herein, at least one magnet 58/80 is positioned in or coupled with the robot 12 and constrains the robot 12 to move parallel to the vertical, magnetically responsive surface 16 ("magnetically responsive" meaning ferromagnetic, having magnets itself, or otherwise able to magnetically interact with magnetic forces). The traction of the wheels 18 on the drive surface 16, however, is imperfect, and may involve at least some drive slippage ("drive" means wheels, rollers or tracks, driven by at least two independent motors, to provide two degrees of freedom). The force of gravity is continually in the same (e.g., downward) direction, so wheel slippage occurs along a vector that can be additive or subtractive to the desired trajectory, depending on the heading of the robot 12. The resulting drift (e.g., deviation from the desired trajectory) can be corrected for by calibrating ahead of time (either at the factory, or using a calibration routine), by real-time measurement of drift and corresponding adjustment, or a combination of these approaches.

With reference to FIG. 32, drift correction is applied as charted therein. In step S321, a desired trajectory 87 is input, selected, or determined (e.g., from a remote controller or input, from an internal program, responsively according to sensed events). "Trajectory" means path—straight, curved, forward, backward, or any combination thereof. In step S322 (which may be optional if a calibration step S327 is used), the gravity vector (having a magnitude and a direction) acting upon the mobile robot 12 is measured using the accelerometer 85 while the robot 12 is magnetically constrained to move parallel to the drive surface 16. The gravity-vector measurement can be taken with a one-, two-, or three-axis accelerometer 85 and can be taken while the robot 12 is turning to determine the direction of gravity. At this time, in step S322, other measurements by other optional sensors may alternatively or also be taken; for example, an angular rate sensor 86 in one, two, or three axes may measure inertial angular rate, which may be used to correct, calibrate, or adjust the gravity vector. Additionally or alternatively, the magnetic force sensor 82 can be used here to measure the magnetic field, as described above.

In step S322, the desired trajectory is adjusted to compensate for estimated and/or modeled drift; e.g., a drift correction is generated to compensate for drive slippage drift in response to and as a function of the gravity vector, and drive commands are generated or adjusted to displace the robot 12 along the desired trajectory 87 in response to the drift correction. That is, the desired trajectory 87 is implemented by generating compensated drive commands that will follow the desired trajectory 87 despite wheel slippage. As shown in FIG. 32, step S322, generating a drive model or correction, precedes measurement in step S323 and adjustment of the trajectory in step S324. However, the drive model or correction many be generated based upon measurements taken in step S323 as well (e.g., may follow or be simultaneous with step S323). The drift correction may be generated at the same time as the robot 12 is displaced along the desired trajectory.

In step S325, the speeds of the drive motor 20 (of the at least two independent motors 20) and/or wheels 18 are updated; e.g., the drive motor 20 and wheels 18 are commanded to displace the robot 12 along a desired trajectory 87 in response to the drift correction. As discussed herein, the surface 16 is selectively marked with the marker 14 and/or erased with the optional eraser 15 along the desired trajectories 87.

The measurement taken in step S323 and/or the generation of the drift model or correction in step S322 and/or the adjustment of the trajectory in step S324 may use the magnitude of a magnetic force between the robot 12 and the drive surface 16, as measured by the magnetic force sensor 82 and/or the angular rotation of the robot 12, as measured by the angular rate sensor 86. In this case, the drift correction may be generated depending on a combination of the gravity vector, the magnetic force, and the angular rotation.

In addition or in the alternative, the measurement taken in step S323 and/or the generation of the drift model or correction in step S322 and/or the adjustment of the trajectory in step S324 may use a camera facing downward, sideways or outward into the room/environment to detect or localize a landmark and/or its pose (an existing object that can be classified and re-recognized, or a placed or drawn fiducial) within a room environment external to the robot rotation and/or may detect projected light within a room environment external to the robot rotation. In this case, the drift correction may be generated depending on a combination of the gravity vector, the magnetic force, the angular rotation, the landmark detection, or the projected light detection.

In addition, or in the alternative, the measurement taken in step S323 and/or the generation of the drift model or correction in step S322 and/or the adjustment of the trajectory in step S324 may use detections of the sensor array 28 as it detects markings at different locations across the width of the robot 12 on the surface 16. The optical sensor array 28 extends across more than 50% of the width of the robot 12. In this case, the drift correction may be generated depending on a combination of the gravity vector, the magnetic force, the angular rotation, the landmark detection, the projected light detection, and/or the detected markings.

Using structures, such as those described herein, actuated linkages, including the actuator arm 94, can be used to move either or both of the marker 14 and the eraser 15 to active (marking and/or erasing) and passive (non-marking and/or non-erasing) positions; the markings may be used for calibration or real-time correction or both. As discussed herein, in association with calibration, correction, or during ordinary operation without calibration or correction, the marker 14 can be lifted between a marking position in which the marker 14 draws upon the surface 16 and a non-marking position in which the marker 14 is not in contact with the surface 16; and the robot 12 may record markings made by the marker 14 in the marking position as markings made by the robot 12 and may also record markings not made by the marker 14 (e.g., markings that are not along or close to a previously followed desired marking trajectory) as markings made by a source other than the robot 12 (e.g., markings made by a person or by another robot or permanent markings upon the surface 16).

Step S327 is an optional step in which a calibration routine is performed to inform the drift model. The calibration routine of step S327 can be performed, e.g., at the factory where the robot 12 is manufactured. Additionally or alternatively, the calibration routine S327 can be performed upon first setup by a user; in additional embodiments, calibration can be performed regularly by the robot (e.g., set by time or distance intervals). In additional embodiments, calibration can be performed as part of service, support, or maintenance by the user or can be integrated into every start-up cycle. For example, the drive motor 20 and wheels 18 may be commanded to displace the robot along a calibration trajectory without drift correction, with the marker 14 in the marking position to draw calibration markings along at least a part of the calibration trajectory. The calibration markings may be detected by the array 28 at different locations across the width of the robot 12 on the surface 16. A drift correction may be generated to compensate for drive slippage drift in response to and as a function of the detections of the gravity vector or the calibration markings (or in combination with other measurements taken during calibration or correction steps).

For example, by script, by predetermined routine, by an algorithm based on the surface 16 characteristics, or by manual or partial manual control, the robot 12 can be driven back and forth while drawing or marking. Optionally, an already determined drift correction or compensation is not used or not used during this routine (e.g., if off, for the purpose of determining appropriate drift compensation or, if on, for checking the performance of a proposed or current drift compensation). Drift is easier to measure over longer distances, so the distance may include a horizontal distance of ½ the surface 16 width or greater or may include a minimum threshold of horizontal travel (e.g., greater than one meter of cumulative horizontal movement). Horizontal movement sufficient to measure drift on smaller surfaces 16 can be commanded as back-and-forth movement. The robot 12, by means of the optical sensor array 28, can record how many times (i.e., what distance) it takes for the 1D camera sensor 28 to detect a set amount of drift (e.g., the drawing mark reaches one end of the scanning sensor). For example, as the robot 12 drives left to right uncompensated, it may drift down, drawing a line angled down from left to right. Should the calibration routine drive the robot 12 from right to left uncompensated (optionally kept horizontal by accelerometer detection) detecting the angled line from right to left, the robot 12 will again drift down and will detect the angled line as, e.g., even more angled because of the drift. Substantially, drift divided by distance driven (e.g., adjusted by any necessary correction coefficient) may give the percent drift along an axis (vertical or horizontal) that is used for trajectory correction. A similar routine can be conducted with a vertical component, e.g., driving diagonally or vertically by drawing, while repeatedly driving up and down for a set distance, wherein the difference between the vertical component of desired lines differs by the drift component. In each case, the robot 12 will eventually drift downward so that the 1D camera or scanner 28 detects the mark the robot 12 is making and can determine a difference between its desired location and its measured or detected location.

Measuring magnetic force may be optional for these calibration methods. In addition, the calibration or correction parameters may be estimated based on a determined relationship between magnetic force and drift percentage. Drive surfaces 16 (e.g., a whiteboard) on which a calibration has already been performed can be fingerprinted by magnetic force, reflectivity, other optical measurement, acoustic measurement; and any combination of these approaches; alternatively, a previously determined and stored (locally or remotely) calibration or correction can be recovered by the robot 12. In additional embodiments, by making assumptions and/or instructing the user during the calibration (e.g., by communicating that the robot's forward motion with equally driven motors 20 is sufficiently straight and doesn't rotate while driving and/or so that the user places the robot nearly horizontal/vertical), a calibration may be performed without an accelerometer 85.

In addition, in the alternative, or independently, the measurement taken in step S323, and/or the generation of the drift model or correction in step S322, and/or the adjustment of the trajectory in step S324, and/or the calibration routine of step S327, and/or normal operation of the robot 12 may detect markings at different locations across the width of the robot 12 on the surface 16. The markings may have been generated by either or both of drawing with the marker 14 (in the marking position, lifting up to not draw) and erasing with the eraser 15 (in the erasing position, lifting up to not erase). The areas (e.g., areas of marking, lines, dots, solid areas) may be detected by the array 28 and recorded in response to, e.g., associated with variables and flags identifying the areas as relating to or associated with the lifting (including placement for marking) of the marker 14, the lifting of the eraser 15 (including placement for erasing), and the displacement of the robot 12 along the desired trajectory 87. In particular, the drift correction or calibration may be generated depending on a combination of the gravity vector, the magnetic force, the angular rotation, the landmark detection, the projected light detection, or the detected markings, as well as the lifting and application of the marker 14 and/or eraser 15.

These steps (and/or additional and/or different steps) may be carried out by structures including those previously described, such as the accelerometer 85 measuring a gravity vector having a magnitude and a direction, the optical sensors 28 detecting markings at different locations across the width of the robot, an actuated linkage moving the holder/marker between the active and passive positions, and a drive including at least two revolving members 18 in contact with the surface 16, driven by at least two motors 20 in at least two degrees of freedom.

Additional examples and embodiments consistent with the present teachings are set out in the following numbered clauses:

31. A marking robot, comprising:
    a robot body;
    at least one magnet in or coupled with the robot body constraining the robot to move parallel to a vertical, magnetically responsive surface;
    a drive configured to displace the robot relative to the surface while the robot is held to the surface;
    a holder configured to hold a marker;
    an accelerometer measuring a gravity vector having a magnitude and a direction;
    a computing device in communication with the optical sensors, the accelerometer, and the drive, wherein the computing device includes a processor and computer-readable memory in communication with the processor, wherein the computer-readable memory includes non-transitory program code for at least one of the following actions:
    a) generating a drift correction to compensate for drive slippage drift in response to and as a function of the gravity vector; and
    b) commanding the drive to displace the robot along a desired trajectory in response to the drift correction.
32. The marking robot according to clause 31, further comprising a magnetic force sensor configured to measure a magnetic field generated by at least one of the magnets of the robot and the vertically oriented magnetic surface, wherein the computer-readable memory further includes non-transitory program code for generating the drift correction in response to and as a function of measurements from the magnetic force sensor.
33. The marking robot according to clause 31, further comprising an angular rate sensor configured to measure angular rotation of the robot, wherein the computer-readable memory further includes non-transitory program code for generating the drift correction in response to and as a function of the angular rotation and the gravity vector.
34. The marking robot according to clause 31, further comprising an array of optical sensors extending across the width of the robot and configured to detect markings on the vertically oriented surface as the robot is displaced across the vertically oriented surface, wherein the computer-readable memory further includes non-transitory program code for generating the drift correction in response to detections of markings from the optical sensors at different locations across the width of the robot and the drive vector.
35. The marking robot according to clause 34, further comprising an actuated linkage configured to move the holder between a marking position in which the marker draws upon the magnetic surface and a non-marking position in which the marker is not in contact with the marking surface, wherein the computer-readable memory further includes non-transitory program code for causing the actuated linkage to place the holder in a marking position to draw reference markings along at least a part of the desired trajectory, and generating the drift correction in response to detections of the reference markings at different locations across the width of the robot from the optical sensors.
36. The marking robot according to clause 31, further comprising an array of optical sensors configured to detect markings at different locations across the width of the robot on the vertically oriented surface as the robot is displaced across the vertically oriented surface, wherein the computer-readable memory further includes non-transitory program code for generating the drift correction in response to detections of pre-existing indicia on the vertical surface from the optical sensors.
37. The marking robot according to clause 31, further comprising a camera sensor configured to detect at least one landmark within a room environment external to the robot, wherein the computer-readable memory further includes non-transitory program code for generating the drift correction in response to detections of the at least one landmark.
37. The marking robot according to clause 31, wherein the computer-readable memory further includes non-transitory program code for adjusting the generated drift correction at the same time as the robot is displaced along the desired trajectory.
38. The marking robot according to clause 31, wherein the drive comprises at least two revolving members in contact with the surface, driven by at least two motors in at least two degrees of freedom.
39. A method for driving a robot, comprising:
    magnetically constraining a robot to move parallel to a vertical, magnetically responsive surface;
    measuring a gravity vector, having a magnitude and a direction, acting upon the mobile robot;
    generating a drift correction to compensate for drive slippage drift in response to and as a function of the gravity vector;
    commanding a drive to displace the robot along a desired trajectory in response to the drift correction; and
    marking the surface with a marker transported by the robot.
40. The method of clause 39, further comprising:
    detecting a magnitude of a magnetic force between the robot and the surface; and
    generating the drift correction in response to and as a function of the detections of the magnetic force and the gravity vector.
41. The method of clause 39, further comprising:
    detecting angular rotation of the robot; and
    generating the drift correction in response to and as a function of the detections of the angular rotation and the gravity vector.
42. The method of clause 39, further comprising:
    detecting a landmark within a room environment external to the robot rotation; and
    generating the drift correction in response to and as a function of the detections of the angular rotation and the landmark.
43. The method of clause 39, further comprising:
    detecting projected light within a room environment external to the robot rotation; and
    generating the drift correction in response to and as a function of the detections of the angular rotation and the projected light.
44. The method of clause 39, further comprising:
    adjusting the generated drift correction at the same time as the robot is displaced along the desired trajectory.
45. The method of clause 39, further comprising:
    detecting markings at different locations across the width of the robot on the surface; and
    generating the drift correction in response to and as a function of the detections of the markings and the gravity vector.

46. The method of clause 45, further comprising:
   lifting the marker between a marking position in which the marker draws upon the surface and a non-marking position in which the marker is not in contact with the surface;
   placing the marker in the marking position to draw markings along at least a part of the desired trajectory.
47. The method of clause 39, further comprising:
   lifting the marker between a marking position in which the marker draws upon the surface and a non-marking position in which the marker is not in contact with the surface;
   recording markings made by the marker in the marking position as markings made by the robot; and
   recording markings not by the marker in the marking position as markings made by other than the robot.
48. The method of clause 39, further comprising:
   detecting markings at different locations across the width of the robot on the surface;
   lifting the marker between a marking position in which the marker draws upon the surface and a non-marking position in which the marker is not in contact with the surface;
   lifting an eraser between an erasing position in which the eraser erases markings on the surface and a non-erasing position in which the eraser is not in contact with the surface; and
   recording marked areas and erased areas of the surface in response to and as a function of the detection of the markings, the lifting of the marker, the lifting of the eraser, and the displacement of the robot along the desired trajectory.
49. The method of clause 39, further comprising:
   detecting markings at different locations across the width of the robot on the surface;
   lifting the marker between a marking position in which the marker draws upon the surface and a non-marking position in which the marker is not in contact with the surface;
   lifting an eraser between an erasing position in which the eraser erases markings on the surface and a non-erasing position in which the eraser is not in contact with the surface; and
   generating the drift correction in response to and as a function of the detection of the markings compared to the lifting of the marker, the lifting of the eraser, and the displacement of the robot along the desired trajectory.
50. The method of clause 39, further comprising:
   commanding the drive to displace the robot along a calibration trajectory without drift correction;
   placing the marker in the marking position to draw calibration markings along at least a part of the calibration trajectory;
   detecting the calibration markings at different locations across the width of the robot on the surface; and
   generating the drift correction to compensate for drive slippage drift in response to and as a function of the detections of the gravity vector and the calibration markings.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $115^{th}$, $1/3$rd $1/2$, $2/3$rd $314^{th}$, $415^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A color- or grayscale-sensing, magnetic, mobile, marking robot, comprising:
   a robot body including a top surface and a bottom surface;
   a marker holder configured to hold a marker and in or coupled with the robot body;
   at least one magnet in or coupled with the robot body;
   at least two wheels coupled with the robot body and extending from the bottom surface of the body, allowing the robot to climb and be displaced across a vertically oriented surface of a magnetic structure with the wheels in contact with the vertically oriented surface, wherein the marker holder is centered between the wheels;
   an actuator configured to reciprocally displace a shaft in the marker holder;
   an array of color or grayscale sensors on at least one of the top surface and the bottom surface and configured to detect color or grayscale patterns as the robot is displaced across the vertically oriented surface; and
   a computing device in communication with the sensors, the actuator, and the wheels, wherein the computing device includes a processor and computer-readable memory in communication with the processor, wherein the computer-readable memory includes non-transitory program code for at least one of the following actions:
   a) displacing the robot; and
   b) actuating the actuator in response to and as a function of measurements from the sensors.
2. The color- or grayscale-sensing, magnetic, mobile, marking robot of claim 1, wherein the marker holder includes an aperture defined by the robot body and through which the shaft is reciprocated.

3. The color- or grayscale-sensing, magnetic, mobile, marking robot of claim 1, further comprising an eraser including a shaft that fits in the marker holder of the robot body and that is actuatable by the actuator to reciprocally place the eraser in contact with the vertically oriented surface and remove the eraser from contact with the vertically oriented surface.

4. The color- or grayscale-sensing, magnetic, mobile, marking robot of claim 2, further comprising at least one dry erase marker including a shaft and a marking tip, wherein the shaft fits in the aperture of the robot body and is actuatable by the actuator to reciprocally place the marking tip in contact with the vertically oriented surface and remove the marking tip from contact with the vertically oriented surface.

5. The color- or grayscale-sensing, magnetic, mobile, marking robot of claim 1, wherein magnets are included in the wheels.

6. The color- or grayscale-sensing, magnetic, mobile, marking robot of claim 1, wherein the color sensors are mounted on the bottom surface of the robot body.

7. The color- or grayscale-sensing, magnetic, mobile, marking robot of claim 6, further comprising a light mounted on the bottom surface of the robot body and configured to generate light that reflects off of the vertically oriented surface and is recorded by the sensors.

8. The color- or grayscale-sensing, magnetic, mobile, marking robot of claim 1, wherein the sensors are mounted on the top surface of the robot body.

9. The color- or grayscale-sensing, magnetic, mobile, marking robot of claim 1, wherein the computer-readable memory includes program code both for displacing the robot and for actuating the actuator in response to and as a function of measurements from the sensors.

10. The color- or grayscale-sensing, magnetic, mobile, marking robot of claim 1, further comprising a magnetic force sensor configured to measure a magnetic field generated by at least one of the magnets of the robot and a magnetic or magnetizable composition over which the robot drives.

11. The color- or grayscale-sensing, magnetic, mobile, marking robot of claim 10, further comprising at least one motor in communication with the computing device and coupled with the wheels to rotate and steer the wheels.

12. The color- or grayscale-sensing, magnetic, mobile, marking robot of claim 11, wherein the non-transitory software code includes code for commands for controlling how much the wheels are rotated and steered as a function of the magnitude of the magnetic field measured by the magnetic force sensor to account for drift of the robot due to wheel slippage.

13. The color- or grayscale-sensing, magnetic, mobile, marking robot of claim 11, further comprising an accelerometer and an angular rate sensor configured to monitor the displacement and rotation of the robot, wherein the accelerometer and the angular rate sensor are in communication with the computing device, wherein the non-transitory software code includes code for commands for controlling how much the wheels are rotated and steered as a function of the measured displacement and rotation.

14. The color- or grayscale-sensing, magnetic, mobile, marking robot of claim 1, further comprising:
    an actuator arm mounted to the robot body and coupled with at least motor to displace first and second ends of the actuator arm in opposition;
    a marker holder on the first end of the actuator arm, wherein the marker holder is configured to hold a marker; and
    an eraser mounted on the second end of the actuator arm, wherein the actuator arm is configured for displacement across each of the following three states when the wheels of the robot are on a drive surface:
    a) a neutral position in which neither the eraser nor a marker mounted in the marker holder contact the drive surface;
    b) a marking position in which a marker mounted in the marker holder contacts the drive surface but the eraser is removed from the drive surface; and
    c) a marking position in which the eraser contacts the drive surface but a marker mounted in the market holder is removed from the drive surface.

15. The color- or grayscale-sensing, magnetic, mobile, marking robot of claim 14, wherein only one motor is coupled with the actuator arm the first and second ends of the actuator.

16. A method for interactive marking by a mobile robot on a vertical surface, comprising:
    displacing a mobile robot including a sensor and an actuated marker across a vertical surface;
    detecting features on, in or behind the vertical surface with the sensor; and
    controlling displacement of the mobile robot and actuation of the actuated marker in response to the detection of the features.

17. The method of claim 16, wherein the detection of features is performed by optically detecting color or grayscale features on the vertical surface.

18. The method of claim 17, further comprising activating light-emitting elements on or in the robot in a color matching a color detected on the vertical surface by the robot.

19. The method of claim 18, further comprising activating the light-emitting elements in a color matching a detected color of the marker.

20. The method of claim 16, wherein the marker is mounted in a marker holder in the robot and actuated via reciprocal displacement of the marker holder and against the vertical surface.

21. The method of claim 20, wherein the marker holder includes an aperture defined in and through the robot.

22. The method of claim 20, wherein an eraser is mounted in the robot, the method further comprising displacing the robot across the vertical surface with the eraser erasing markings made by the marker on the vertical surface.

23. The method of claim 22, further comprising actuating the marker and the eraser with an actuator arm and actuating the marker and the eraser across each of the following states:
    a) a neutral position in which neither the eraser nor a marker mounted in the marker holder contact the drive surface;
    b) a marking position in which a marker mounted in the marker holder contacts the drive surface but the eraser is removed from the drive surface; and
    c) a marking position in which the eraser contacts the drive surface but a marker mounted in the market holder is removed from the drive surface.

24. The method of claim 16, further comprising controlling displacement of the robot and actuation of the marker using an external controller that is not physically coupled with the robot.

25. The method of claim 16, wherein the robot is adhered to the vertical surface via magnets.

26. The method of claim 16, wherein the vertical surface is a whiteboard.

27. The method of claim 16, wherein the mobile robot includes wheels in contact with the vertical surface, and wherein the mobile robot is displaced on the vertical surface by rotating the wheels, the method further comprising:
    detecting slippage of at least one of the wheels on the vertical surface; and
    adjusting displacement of the robot to compensate for the slippage.

28. The method of claim 16, further comprising scanning a code from a book with an external controller and communicating commands to the mobile robot for execution in response to the scanned code.

29. The method of claim 16, wherein the robot further includes a magnetic force sensor, the method further comprising measuring a magnetic field with the magnetic force sensor and controlling at least one of the displacement and steering of the robot based on the magnitude of the magnetic field measured by the magnetic force sensor.

30. The method of claim 16, wherein the robot further includes an accelerometer and an angular rate sensor, the method further comprising measuring acceleration and angular rotation of the robot, respectively, with the accelerometer and the angular rate sensor.

31. A marking robot, comprising:
    a robot body;
    at least one magnet in or coupled with the robot body constraining the robot to move parallel to a vertical, magnetically responsive surface;
    a drive configured to displace the robot relative to the surface while the robot is held to the surface;
    a holder configured to hold a marker;
    an accelerometer measuring a gravity vector having a magnitude and a direction;
    a computing device in communication with the optical sensors, the accelerometer, and the drive, wherein the computing device includes a processor and computer-readable memory in communication with the processor, wherein the computer-readable memory includes non-transitory program code for at least one of the following actions:
    a) generating a drift correction to compensate for drive slippage drift in response to and as a function of the gravity vector; and
    b) commanding the drive to displace the robot along a desired trajectory in response to the drift correction.

32. A method for driving a robot, comprising:
    magnetically constraining a robot to move parallel to a vertical, magnetically responsive surface;
    measuring a gravity vector, having a magnitude and a direction, acting upon the mobile robot;
    generating a drift correction to compensate for drive slippage drift in response to and as a function of the gravity vector;
    commanding a drive to displace the robot along a desired trajectory in response to the drift correction; and
    marking the surface with a marker transported by the robot.

* * * * *